United States Patent
Katakura et al.

(10) Patent No.: US 7,500,932 B2
(45) Date of Patent: Mar. 10, 2009

(54) SHIFT CONTROL APPARATUS AND METHOD FOR AUTOMATIC TRANSMISSION

(75) Inventors: Shusaku Katakura, Kanagawa (JP); Masaaki Uchida, Kanagawa (JP); Yoshinobu Kawamoto, Kanagawa (JP); Tomoaki Honma, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 421 days.

(21) Appl. No.: 11/483,097

(22) Filed: Jul. 10, 2006

(65) Prior Publication Data

US 2007/0012538 A1  Jan. 18, 2007

(30) Foreign Application Priority Data

Jul. 15, 2005  (JP) ............................. 2005-207536

(51) Int. Cl.
*F16H 31/00* (2006.01)

(52) U.S. Cl. ....................................... 475/123

(58) Field of Classification Search ............... 475/120, 475/121, 122, 123
See application file for complete search history.

(56) References Cited

U.S. PATENT DOCUMENTS

| | | | | |
|---|---|---|---|---|
| 5,211,079 | A | * 5/1993 | Runde et al. | 477/61 |
| 5,282,401 | A | * 2/1994 | Hebbale et al. | 475/123 |
| 5,782,711 | A | 7/1998 | Tsutsui et al. | |
| 5,890,392 | A | 4/1999 | Ludanek et al. | |
| 2004/0038776 | A1 | 2/2004 | Kuhstrebe et al. | |
| 2008/0017467 | A1 | * 1/2008 | Honma et al. | 192/3.61 |
| 2008/0020897 | A1 | * 1/2008 | Honma et al. | 477/149 |
| 2008/0026910 | A1 | * 1/2008 | Honma et al. | 477/149 |

FOREIGN PATENT DOCUMENTS

| | | |
|---|---|---|
| EP | 1 450 074 A2 | 8/2004 |
| JP | 9-170654 A | 6/1997 |
| JP | 2000-110929 A | 4/2000 |

* cited by examiner

*Primary Examiner*—Dirk Wright
(74) *Attorney, Agent, or Firm*—Foley & Lardner LLP

(57) ABSTRACT

A shift control apparatus includes an automatic transmission provided with a first friction-engagement element and a second friction-engagement element; and a friction-engagement element control section configured to control the first and second friction-engagement elements. The friction-engagement element control section includes a target-value setting section configured to set a first target differential speed; a first control section configured to bring a rotational speed difference of the first friction-engagement element gradually close to the first target differential speed; and a second control section. The second control section includes a torque-capacity calculating section configured to calculate a total transfer-torque capacity, and a distribution ratio setting section configured to set a distribution ratio between transfer-torque capacities of the first and second friction-engagement elements. The second control section sets transfer-torque capacities of the first and second friction-engagement elements on the basis of the calculated total transfer-torque capacity and the set distribution ratio, and adjusts each of engagement-control parameters for the first and second friction-engagement elements in accordance with the set transfer-torque capacities of the first and second friction-engagement elements.

28 Claims, 12 Drawing Sheets

SHIFT CONTROL APPARATUS AND METHOD FOR AUTOMATIC TRANSMISSION

BACKGROUND OF THE INVENTION

The present invention relates to shift (or changeover) control apparatus and method for an automatic transmission adapted to transmit a power by engaging a clutch (or friction-engagement element) according to the shift, and more particularly to shift control apparatus and method in which the engaged clutch is controllably changed from a first clutch (first friction-engagement element) to a second clutch (second friction-engagement element) when the shift is carried out.

Generally when carrying out a shift of automatic transmission (when changing a shift-step), a friction-engagement element such as a clutch is changed from a disengaged state to an engaged state, or changed from the engaged state to the disengaged state. In such a case, it is desired that an operation for the friction-engagement element is performed smoothly and quickly so as not to generate a shock at the time of the shift. Hence, the following techniques are disclosed. A Japanese Patent Application Publication No. 1997(H09)-170654 exemplifies a previously proposed control apparatus. In this technique, a hydraulic pressure to a hydraulic servo of friction-engagement element is adjusted in order to reduce the shock generated at the time of the shift. Moreover, a Japanese Patent Application Publication No. 2000-110929 exemplifies a previously proposed control apparatus. In this technique, when an input torque of the transmission is varied during the shift during which a changeover of friction-engagement element is conducted; a working fluid pressure for engagement-side element (i.e., friction-engagement element to be engaged) or a working fluid pressure for disengagement-side element is varied to its value corresponding to the varied input torque, point by point, by checking the variation of input torque of the transmission.

SUMMARY OF THE INVENTION

However, in the technique disclosed in the above former Japanese Patent Application Publication No. 1997(H09)-170654, although a target hydraulic pressure of engagement-side element at the start time of an inertia phase is calculated in accordance with an input torque; after that time, the friction-engagement element is controlled by focusing on hydraulic pressure. Regarding the disengagement-side element (i.e., friction-engagement element to be changed from engaged state to disengaged state), although a torque for disengagement-side element and the hydraulic pressure for disengagement-side element are calculated on the basis of the input torque and the hydraulic pressure for engagement-side element at the start time of an inertia phase; after that time, the friction-engagement element is controlled by focusing on hydraulic pressure. Thus both engagement-side element and disengagement-side element are controlled with a focus on the hydraulic pressure. Hence, a special calculation formula taking into account each characteristic of two friction-engagement elements is necessary when controlling two friction-engagement elements concurrently.

Moreover in the technique disclosed in the above former Japanese Patent Application, a relation between control results of engagement-side and disengagement-side friction-engagement elements is difficult to be understood. Hence, this technique is difficult to apply to a control focusing on the condition of differential speed of each friction-engagement element or the condition of a transfer-torque distribution between both friction-engagement elements. Namely it is conceivable that a stable shift control can be performed more smoothly and without excessive shock, if the friction-engagement elements are controlled by focusing on the above differential speed condition or transfer-torque distribution condition not only during the inertia phase but during engaging or disengaging process of each friction-engagement element.

On the other hand, in the technique disclosed in the above latter Japanese Patent Application Publication No. 2000-110929; a (ever-changing) total amount of torque transfer-capacity for both friction-engagement elements and a torque share amount for each friction-engagement element are ambiguous since two friction-engagement elements are respectively controlled by means of corresponding control logics different (separated) from each other. Hence, it is difficult or impossible to separate and adjust the differential speed control for each friction-engagement element and the torque distribution-ratio control for both friction-engagement elements from each other. Accordingly, significant development man-hours are required when trying to perform the shift (changeover) control for friction-engagement elements by focusing on the differential speed condition of each friction-engagement element or the transfer-torque distribution condition of both friction-engagement elements as mentioned above.

It is, therefore, an object of the present invention to provide shift control apparatus and method for an automatic transmission, devised to perform a stable shift (or changeover) control more smoothly and with a mild shock, and devised to simply achieve the control focusing on the differential speed condition of friction-engagement element or the transfer-torque distribution condition of both friction-engagement elements to become easily applicable to various automatic transmissions.

According to one aspect of the present invention, there is provided a shift control apparatus comprising: an automatic transmission adapted to vary and output a rotational speed inputted from an engine by engaging any of a plurality of friction-engagement elements in accordance with a shift-step of the transmission, the plurality of friction-engagement elements including a first friction-engagement element adapted to be changed from an engaged state to a disengaged state when changing the shift-step, and a second friction-engagement element adapted to be changed from the disengaged state to the engaged state when changing the shift-step; and a friction-engagement element control section configured to control the first and second friction-engagement elements by adjusting each of an engagement-control parameter for the first friction-engagement element and an engagement-control parameter for the second friction-engagement element when changing the shift-step, the friction-engagement element control section including; a target-value setting section configured to set a first target differential speed which is a target value antecedent to the change of shift-step for a rotational speed difference between an input and an output of the first friction-engagement element; a first control section configured to carry out a first control that adjusts the engagement-control parameter for the first friction-engagement element to bring the rotational speed difference between the input and the output of the first friction-engagement element gradually close to the first target differential speed, by causing the first friction-engagement element to slip from a start time of the change of shift-step; and a second control section having a torque-capacity calculating section configured to calculate or estimate a total transfer-torque capacity which is required to maintain the rotational speed difference of the first friction-engagement element substantially at the first target differential speed, and a distribution ratio setting section configured to set a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element; the second control section being configured to carry out a second control after the first control, the second control setting the transfer-torque capacities of the first and second friction-engagement elements on the basis of the total transfer-torque capacity calculated or estimated by the torque-capacity calculating section and the distribution ratio set by the distribution ratio setting section, and adjusting each of the engagement-control parameters for the first and second friction-engagement elements, in accordance with the set transfer-torque capacities of the first and second friction-engagement elements.

According to another aspect of the present invention, there is provided a shift control method for an automatic transmission adapted to transmit a power by engaging any of a plurality of friction-engagement elements in accordance with a shift-step of the transmission, the plurality of friction-engagement elements including a first friction-engagement element adapted to be changed from an engaged state to a disengaged state when changing the shift-step, and a second friction-engagement element adapted to be changed from the disengaged state to the engaged state when changing the shift-step, the shift control method comprising: a first step of adjusting an engagement-control parameter for the first friction-engagement element to bring a rotational speed difference between an input and an output of the first friction-engagement element gradually close to a target differential speed set as a target value antecedent to the change of shift-step, by causing the first friction-engagement element to slip from a start time of the change of shift-step; and a second step of calculating or estimating a total transfer-torque capacity which is required to maintain the rotational speed difference of the first friction-engagement element substantially at the target differential speed, setting a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element, setting the transfer-torque capacities of the first and second friction-engagement elements on the basis of the calculated or estimated total transfer-torque capacity and the set distribution ratio, and adjusting each of the engagement-control parameters for the first and second friction-engagement elements, in accordance with the set transfer-torque capacities of the first and second friction-engagement elements.

According to still another aspect of the present invention, there is provided a shift control apparatus comprising: an automatic transmission adapted to vary and output a rotational speed inputted from an engine by engaging any of a plurality of friction-engagement elements in accordance with a shift-step of the transmission, the plurality of friction-engagement elements including a first friction-engagement element adapted to be changed from an engaged state to a disengaged state when changing the shift-step, and a second friction-engagement element adapted to be changed from the disengaged state to the engaged state when changing the shift-step; and friction-engagement element control means for controlling the first and second friction-engagement elements by adjusting each of an engagement-control parameter for the first friction-engagement element and an engagement-control parameter for the second friction-engagement element when changing the shift-step, the friction-engagement element control means including; target-value setting means for setting a first target differential speed which is a target value antecedent to the change of shift-step for a rotational speed difference between an input and an output of the first friction-engagement element; first control means for carrying out a first control that adjusts the engagement-control parameter for the first friction-engagement element to bring the rotational speed difference between the input and the output of the first friction-engagement element gradually close to the first target differential speed, by causing the first friction-engagement element to slip from a start time of the change of shift-step; and second control means for carrying out a second control after the first control, the second control means having torque-capacity calculating means for calculating or estimating a total transfer-torque capacity which is required to maintain the rotational speed difference of the first friction-engagement element substantially at the first target differential speed, and distribution ratio setting means for setting a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element; the second control setting the transfer-torque capacities of the first and second friction-engagement elements on the basis of the total transfer-torque capacity calculated or estimated by the torque-capacity calculating means and the distribution ratio set by the distribution ratio setting means, and adjusting each of the engagement-control parameters for the first and second friction-engagement elements, in accordance with the set transfer-torque capacities of the first and second friction-engagement elements.

The other objects and features of this invention will become understood from the following description with reference to the accompanying drawings.

DETAILED DESCRIPTION OF THE INVENTION

Figure 1:
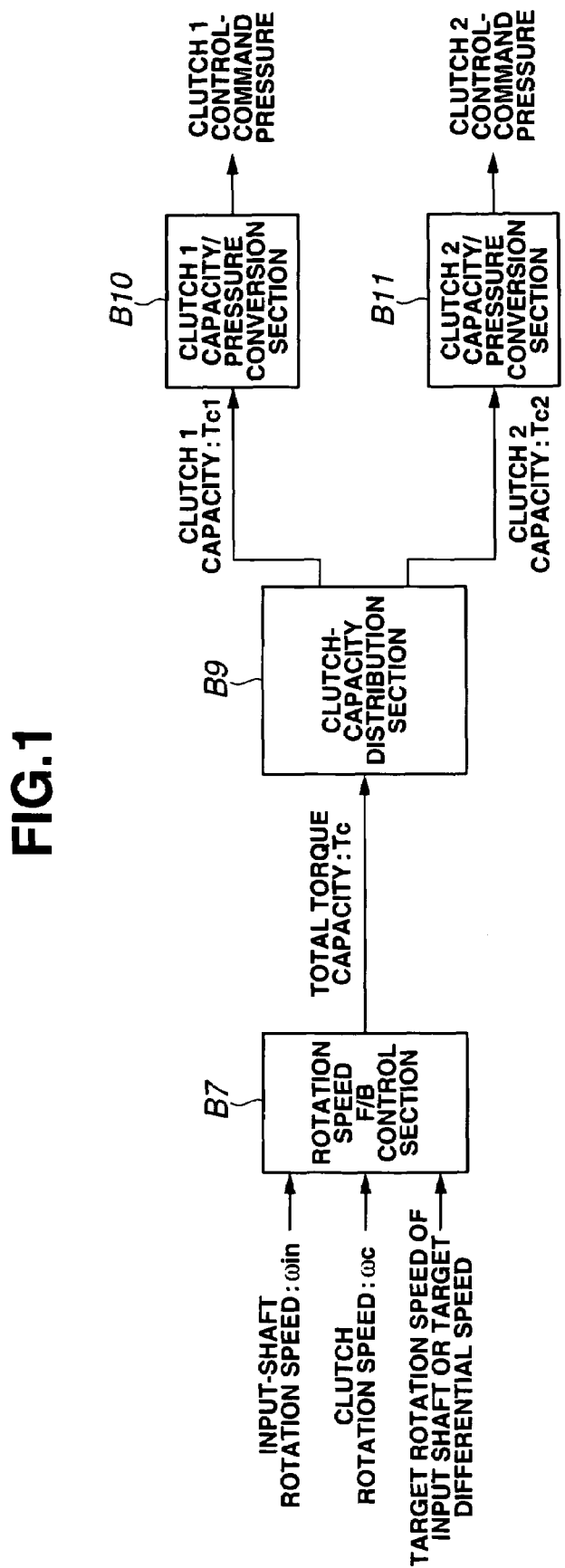
FIG. 1 is a schematic block diagram showing a basic configuration of shift (changeover) control apparatus for an automatic transmission in a first embodiment according to the present invention.

Reference will hereinafter be made to the drawings in order to facilitate a better understanding of the present invention.

[Common Structure of Shift Control for Automatic Transmission in Embodiments According to the Present Invention]

At first, a principle and a basic structure of shift (or changeover) control common among after described embodiments according to the present invention, will now be explained with reference to FIGS. 1 to 6. FIG. 2 is a schematic diagram showing a structure of general four-speed (four-step) automatic transmission. As shown in FIG. 2, the automatic transmission is mounted between an input shaft 11 and an output shaft 12. This automatic transmission includes two planetary gear sets 21 and 22 in series.

First planetary gear set 21 includes a sun gear 21S (S1), a carrier 21C (C1), and a ring gear 21R (R1). Second planetary gear set 22 includes a sun gear 22S (S2), a carrier 22C (C2), and a ring gear 22R (R2). A brake 23 (clutch C) is interposed between sun gear 21S of first planetary gear set 21 and a casing 13, as a friction-engagement element. Sun gear 21S is forced to stop rotating by engaging brake 23. A clutch 24 (D) is interposed between sun gear 21S and input shaft 11, as a friction-engagement element. Sun gear 21S is forced to rotate integrally with (together with) input shaft 11 by engaging clutch 24. Hereinafter, the friction-engagement element such as clutch or brake is simply referred as clutch.

Carrier 21C pivotally supports planetary pinions of first planetary gear set 21, namely carrier 21C supports the planetary pinions so that the planetary pinions pivot on carrier 21C. A clutch 25 (E) is interposed between carrier 21C and input shaft 11. Carrier 21C is forced to rotate as a unit with (integrally with) input shaft 11 by means of the engagement of clutch 25. A brake 26 (clutch A) is interposed between carrier 21C and casing 13. Carrier 21C is forced to stop rotating by means of the engagement of brake 26. Moreover, a clutch 27 (B) is interposed between carrier 21C and ring gear 22R. Carrier 21C is forced to rotate integrally with ring gear 22R by means of the engagement of clutch 27.

Ring gear 21R is directly connected with carrier 22C pivotally supporting planetary pinions of second planetary gear set 22. On the other hand, sun gear 22S is directly connected with input shaft 11. Carrier 22C is directly connected with ring gear 21R, and is directly connected with output shaft 12. Ring gear 22R of second planetary gear set 22 is connected through clutch 27 with carrier 21C of first planetary gear set 21, as mentioned above.

Figure 3:
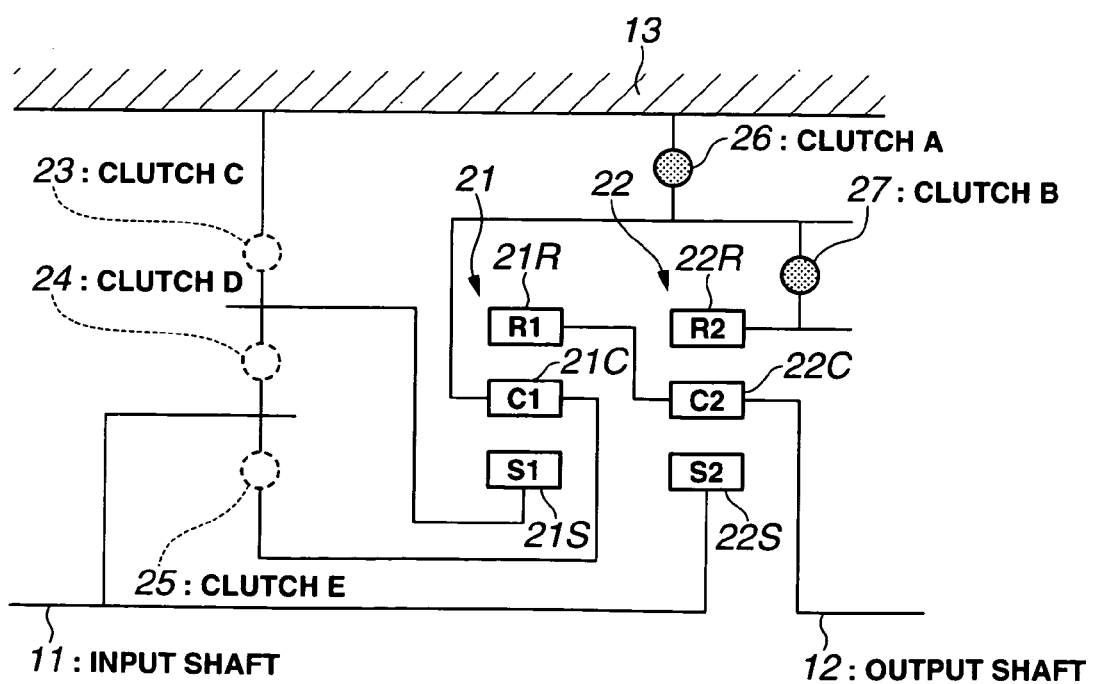
FIG. 3 is a view explaining a changeover of the automatic transmission of FIG. 2.
Figure 4:
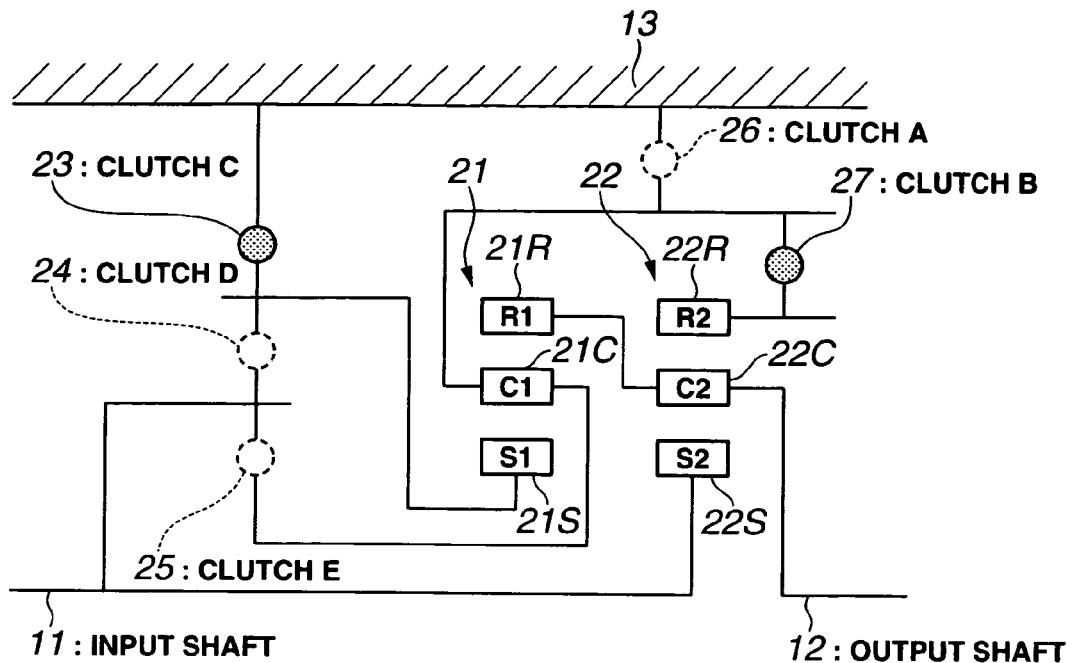
FIG. 4 is a view explaining a changeover of the automatic transmission of FIG. 2.

For example when achieving a transmission ratio (speed ratio of the transmission) corresponding to first-speed (first-gear-speed of the transmission); clutch 26 and clutch 27 are made to become in an engaged state, and the other clutches are made to become in a disengaged (released) state, as shown in FIG. 3. Similarly, when achieving a transmission ratio corresponding to second-speed; clutch 23 and clutch 27 are made to become in engaged state, and the other clutches are made to become in disengaged state, as shown in FIG. 4. Accordingly when shifting the transmission from the first-speed to the second-speed (i.e., when the state of transmission gears is changed from the first to the second); clutch 27 is kept to be engaged, and the engaged clutch 26 is released, and the disengaged clutch 23 is engaged. Thus, the transmission is adapted to vary and output rotational speed inputted from e.g., an engine connected with the transmission, by engaging one or more clutches of a plurality of clutches in accordance with the shift-step of transmission.

Figure 5:
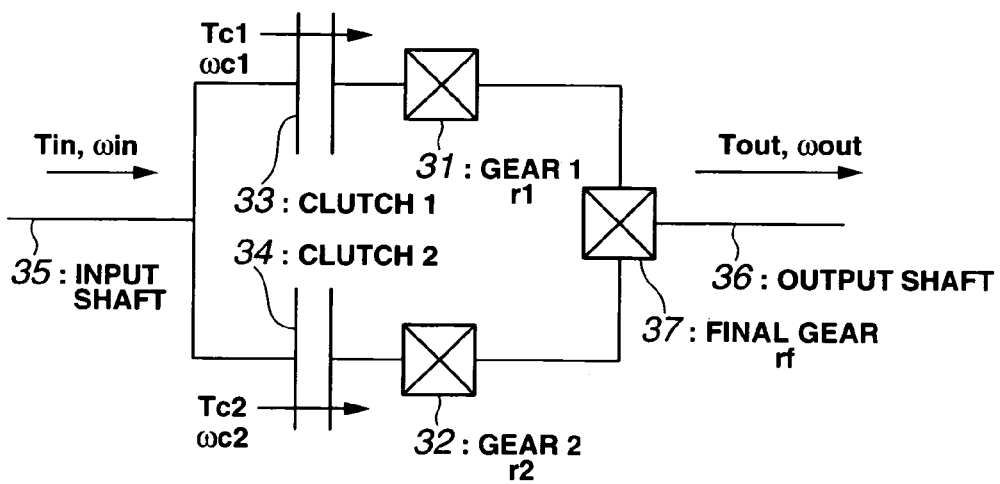
FIG. 5 is a view showing a simplified basic structure of the automatic transmission according to the shift (changeover) control in the first embodiment.

In order to simply consider this changeover of the transmission, an extreme simplification of structure of the transmission can be provided as shown in FIG. 5. FIG. 5 is a schematic diagram showing a simplified basic structure of automatic transmission related to the changeover control. FIG. 5 shows the simplified transmission structure which includes a clutch 33 connected in series with a gear train 31 serving to achieve one transmission ratio (e.g. first-speed); and a clutch 34 connected in series with a gear train 32 serving to achieve another transmission ratio (e.g. second-speed). This clutch 33 is connected in parallel with clutch 34; and moreover one side of clutch 33 is connected to the input-shaft side and another side of clutch 33 is connected with an output shaft 36 through gear train 31, a final gear 37 and the like. Similarly, one side of clutch 34 is connected to the input-shaft side and another side of clutch 34 is connected with output shaft 36 through gear train 32, final gear 37 and the like.

Figure 6:
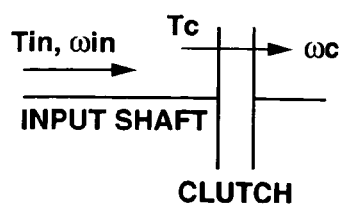
FIG. 6 is a view showing a further simplified basic structure of the automatic transmission according to the shift (changeover) control in the first embodiment.

The above-described shift (changeover) from the first-speed to the second-speed can be considered, as a shift control causing the currently-engaged clutch 33 to be released and causing the currently-disengaged clutch 34 to be engaged in the two-speed transmission shown in FIG. 5. Moreover when considering a configuration of this changeover from clutch 33 to clutch 34 from a viewpoint of a differential rotation control of clutch 33 or 34, the differential rotation-speed of any of clutch 33 and clutch 34 is controlled by controlling engagement capacities Tc1 and Tc2 of two clutches 33 and 34 in accordance with an input torque Tin and an input rotation speed $\omega$in. It is noted that this term "engagement capacity" means an engagement degree or engagement force of clutch, in other words, a torque transmitting ability by its engaging pressure. Hence by extracting only a clutch part from the two-speed transmission shown in FIG. 5, the changeover control from clutch 33 to clutch 34 can be replaced with a differential rotation-speed control which is performed by an engagement capacity control for one integrated clutch as shown in FIG. 6, for the sake of simple consideration.

Figure 2:
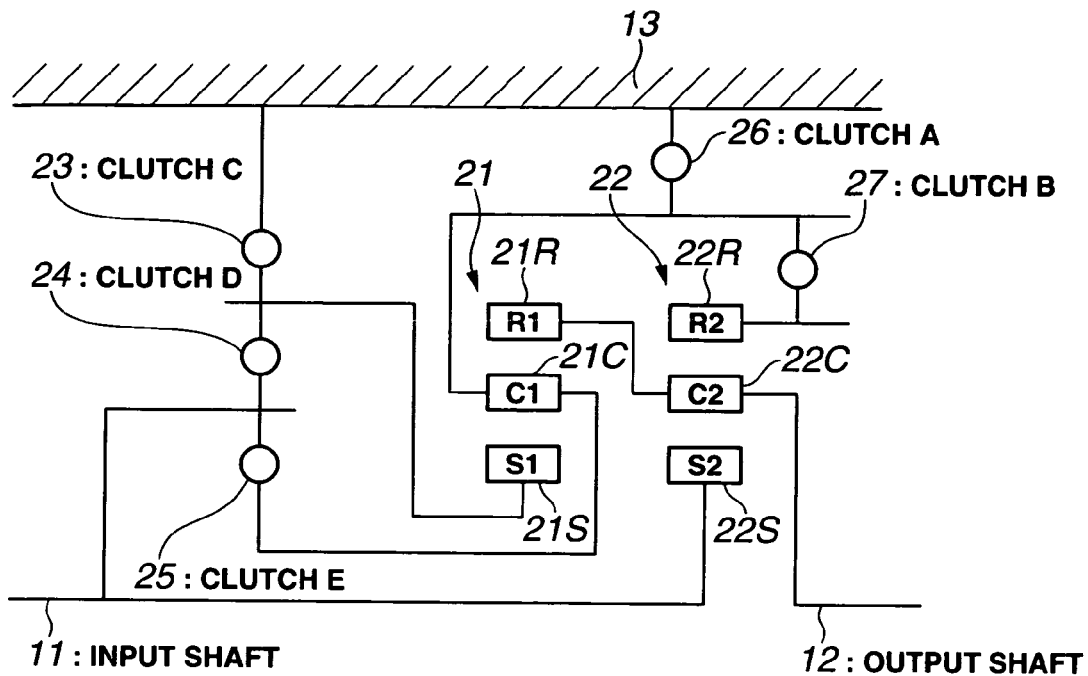
FIG. 2 is a view explaining an example of a main structure of automatic transmission according to the shift (changeover) control in the first embodiment.

Therefore, the shift control apparatus for an automatic transmission in respective embodiments according to the present invention generally includes a rotation-speed feedback control section B7 as a functional component of the rotation-speed control for clutch (i.e., rotation speed control for the input side of clutch, or differential-speed control for clutch), and a clutch-capacity distribution section B9 as a functional component of a distribution ratio control for clutch (es), as shown in FIG. 1. This rotation-speed feedback control section B7 is provided functionally before clutch-capacity distribution section B9. By such a configuration, a total torque capacity of two of a disengagement-side clutch 1 (i.e., clutch being in currently disengaging state or scheduled to be disengaged) and an engagement-side clutch 2 (i.e., clutch being in currently engaging state or scheduled to be engaged) is controlled or adjusted so as to cause a rotation speed of input shaft of transmission to range within a predetermined tolerance. Alternatively, the total torque capacity of two of disengagement-side clutch 1 and engagement-side clutch 2 may be controlled so as to cause a differential rotation speed between the input and the output of disengagement-side clutch 1 to range within a predetermined tolerance. At the same time, the distribution ratio for distributing the total torque capacity to the two clutches is controllably varied. Thereby, a replacing control for varying the distribution (or share) of transfer torque between two clutches is achieved while performing the (differential) rotation-speed control of clutch. Finally, the transfer torque capacity of disengagement-side clutch 1 is converted to a corresponding control pressure (value) in a conversion section B10, and the transfer torque capacity of engagement-side clutch 2 is converted to a corresponding control pressure in a conversion section B11. Then, control commands representing thus-determined control pressure values are outputted and executed.

By thus-constructed configuration (or concept), the (differential) rotation-speed control of clutch can be separated from the control for distribution ratio of torque. Then finally, the integrated control quantity or parameter in dependence upon these two controls can be produced for the execution of shift control. Therefore, the thus-constructed configuration is easy to be applied to various types of shift control for automatic transmission. Furthermore, the thus-constructed configuration is applicable to all up-shifts and coasting down-shifts, only by controlling a controlled object (i.e., clutch(es) related to the shift), a target value for rotation control (i.e., target value for rotational speed of input shaft, or target value for differential speed between input shaft and output shaft of the disengagement-side clutch), and a distribution ratio of transfer torque for the disengagement-side clutch and the engagement-side clutch. Hence, a control system based on the thus-constructed configuration (or concept) can become simple. Therefore, such a control technique can be easily applied to various automatic transmissions, and moreover can achieve a smooth and stable shift control with little shock.

First Embodiment

Shift control apparatus and method for an automatic transmission in a first embodiment according to the present invention will now be explained with reference to FIGS. 7 to 13.

<Structure of Automatic Transmission>

Figure 8:
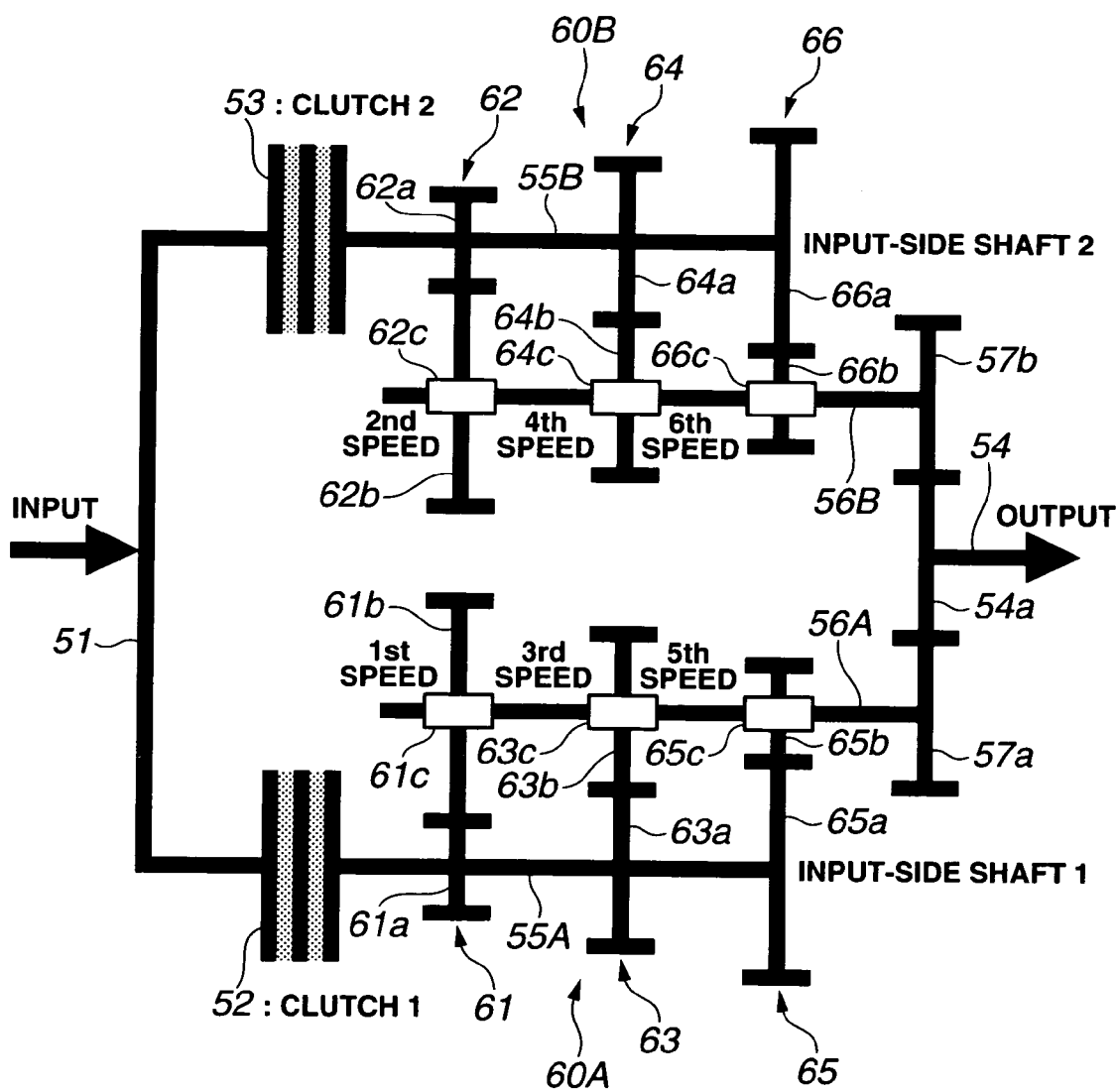
FIG. 8 is a view explaining an automatic transmission's structure applicable to the changeover control according to the first embodiment.

At first, the explanation about a structure of automatic transmission according to this embodiment is described as follows. As shown in FIG. 8, this automatic transmission includes an input shaft 51, a first clutch 52 (1), a second clutch 53 (2), an output shaft 54, a shift gear mechanism 60A, and a shift gear mechanism 60B. Input shaft 51 is connected with the input-side member of first clutch 52, and is connected with the input-side member of second clutch 53. Shift gear mechanism 60A is interposed between first clutch 52 and output shaft 54. Shift gear mechanism 60B is interposed between second clutch 53 and output shaft 54. Each of first clutch 52 and second clutch 53 is, for example, a hydraulically-controlled multiple disc clutch.

Shift gear mechanism 60A includes an input-side shaft (input shaft) 55A, an output-side shaft (output shaft) 56A, a first-speed gear set 61, a third-speed gear set 63, and a fifth-speed gear set 65. First-speed gear set 61 is interposed between input-side shaft 55A and output-side shaft 56A, and includes a gear 61a, a gear 61b, and an engaging mechanism 61c having synchromesh function (hereinafter also called, "synchro"). Third-speed gear set 63 is interposed between input-side shaft 55A and output-side shaft 56A, and includes a gear 63a, a gear 63b, and an engaging mechanism 63c having synchromesh function. Fifth-speed gear set 65 is interposed between input-side shaft 55A and output-side shaft 56A, and includes a gear 65a, a gear 65b, and an engaging mechanism 65c having synchromesh function.

Shift gear mechanism 60B includes an input-side shaft 55B, an output-side shaft 56B, a second-speed gear set 62, a fourth-speed gear set 64, and a sixth-speed gear set 66. Second-speed gear set 62 is interposed between input-side shaft 55B and output-side shaft 56B, and includes a gear 62a, a gear 62b, and an engaging mechanism 62c having synchromesh function. Fourth-speed gear set 64 is interposed between input-side shaft 55B and output-side shaft 56B, and includes a gear 64a, a gear 64b, and an engaging mechanism 64c having synchromesh function. Sixth-speed gear set 66 is interposed between input-side shaft 55B and output-side shaft 56B, and includes a gear 66a, a gear 66b, and an engaging mechanism 66c having synchromesh function.

Moreover, a gear 57a is fixedly installed at the output-end portion of output-side shaft 56A. Gear 57a is adapted to mesh (engage) with a gear 54a of output shaft 54 so as to transmit a power from output-side shaft 56A to output shaft 54. A gear 57b is fixedly installed at the output-end portion of output-side shaft 56B. Gear 57b is adapted to mesh with a gear 54a of output shaft 54 so as to transmit a power from output-side shaft 56B to output shaft 54. When attaining the shift-steps of first-speed, third-speed, and fifth-speed; only the engaging mechanism 61c, 63c, or 65c of the gear set corresponding to the desired shift-step among engaging mechanisms 61c, 63c, and 65c is engaged, then first clutch 52 is engaged, and second clutch 53 is disengaged. When attaining the shift-steps of second-speed, fourth-speed, and sixth-speed; only the engaging mechanism 62c, 64c, or 66c of the gear set corresponding to the desired shift-step among engaging mechanisms 62c, 64c, and 66c is engaged, then first clutch 52 is disengaged, and second clutch 53 is engaged.

<Functional Configuration Related to Changeover Control>

In this embodiment, the changeover (or shift) control according to the present invention is applied in the case where one of first clutch 52 and second clutch 53 is changed from in engaged (closed) state to in disengaged (open) state and another of first clutch 52 and second clutch 53 is changed from in disengaged state to in engaged state. Namely in this embodiment, the changeover control according to the present invention is applied, when one of first clutch 52 and second clutch 53 is disengaged and another of first clutch 52 and second clutch 53 is engaged at the request of attainment of the above-explained shift-steps of transmission (for example, at the request of change from first-speed to second-speed). The explanation of this embodiment will be given by regarding first clutch 52 as a clutch 1 which is changed from engaged state to released state, and regarding second clutch 53 as a clutch 2 which is changed from released state to engaged state. However as a matter of course, the shift control according to the present invention can be also applied to the case where first clutch 52 is changed from released state to engaged state and second clutch 53 is changed from engaged state to released state.

The changeover (shift) control apparatus according to this embodiment includes the above-mentioned basic structure as shown in FIG. 1. In more detail by focusing on its shift control phase, the changeover control apparatus according to this embodiment includes a changeover phase (also called, a second control) explained above as the basic structure, a preparation phase (also called, a first control), an inertia phase (also called, a third control), and a finishing phase (also called, a fourth control). The preparation phase is defined as a phase for preparing for the changeover functionally before the changeover phase. The inertia phase is defined as a phase for adjusting an inertia part (i.e., effect relevant to inertia), functionally subsequent to the changeover phase. The finishing phase is defined as a phase for finishing the shift control functionally after the inertia phase.

Figure 7:
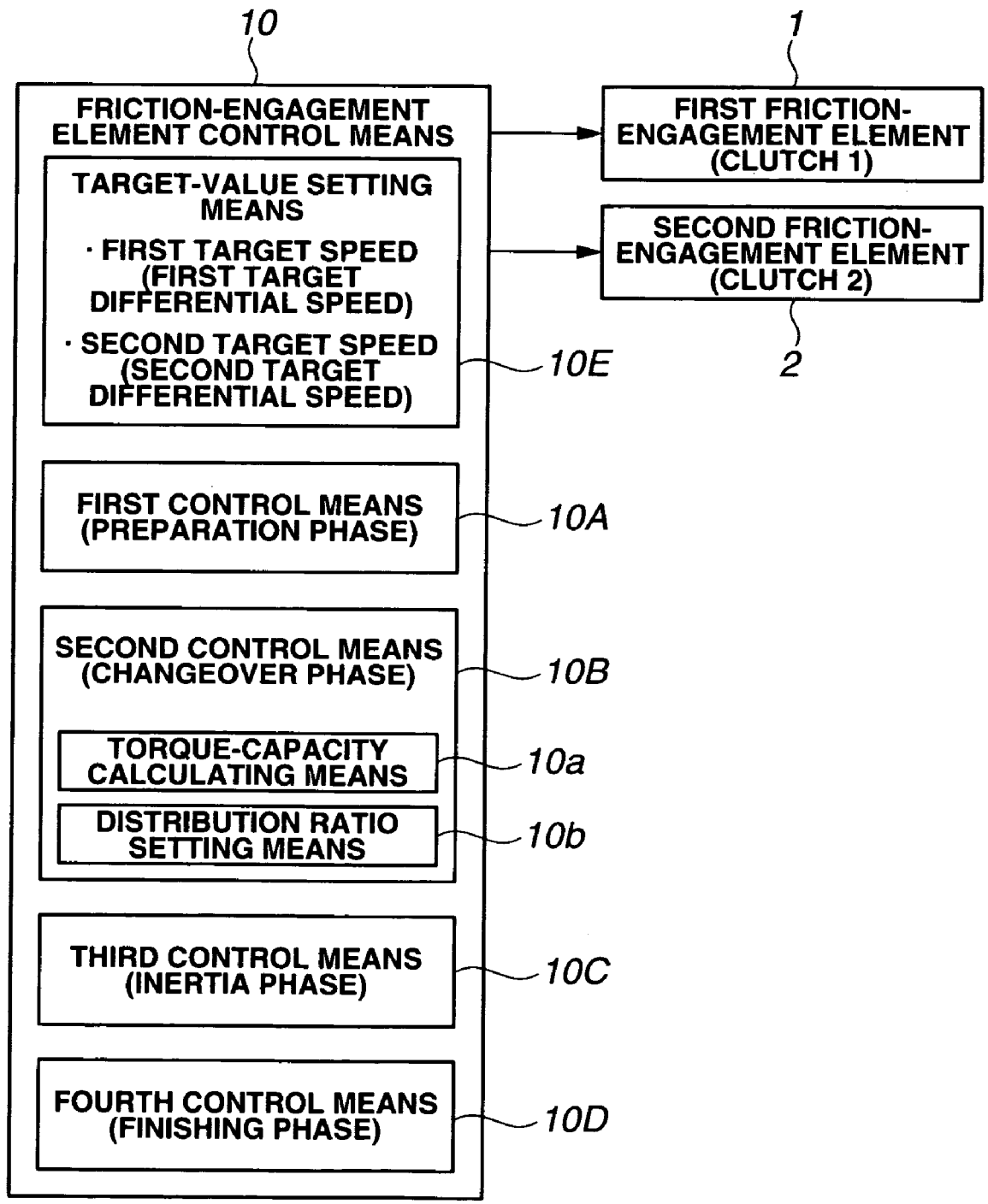
FIG. 7 is a control block diagram showing a main configuration of shift (changeover) control apparatus for automatic transmission in the first embodiment.

From such a viewpoint, it can be considered that a control function (a friction-engagement element control means or section) 10 of this shift control apparatus includes a function (or means) 10A for performing the preparation phase, a function 10B for performing the changeover phase, a function 10C for performing the inertia phase, and a function 10D for performing the finishing phase, as shown in FIG. 7. These functions 10A to 10D are respectively called a first control means (or section), a second control means (or section), a third control means (or section), and a fourth control means (or section), in this explanation. Moreover, the friction-engagement element control means 10 includes a target-value setting means (or section) 10E which is one of main functional features in the control apparatus of this embodiment. The friction-engagement element control means 10 and functions 10A to 10E thereof are provided as functional components in an ECU (electrical control unit) for transmission.

The target-value setting means 10E sets a first target rotational-speed (target speed 1) and a second target rotational-speed (target speed 2). The first target rotational-speed is a pre-change target value for the input-shaft rotational speed of transmission. In this embodiment, this first target rotational-speed corresponds to a target value for the input-side rotational speed of disengagement-side clutch, which is used before changing the shift-step (such as first-speed or second-speed). The second target rotational-speed is a post-change target value for the input-shaft rotational speed of transmission. In this embodiment, this second target rotational-speed corresponds to a target value for the input-side rotational speed of engagement-side clutch, which is used after changing the shift-step.

First control means 10A adjusts an engagement control quantity or parameter (i.e., controlled variable for its engaging pressure) for the disengagement-side clutch (representing a clutch being in currently disengaging state or scheduled to be disengaged as mentioned above), so as to bring the disengagement-side clutch into a slipping state from the start time of change of the shift-step and then so as to cause the input-shaft rotational speed of transmission (the input-side rotational speed of disengagement-side clutch) to gradually approach the first target rotational-speed. Namely, the input-side rotational speed of disengagement-side clutch is brought asymptotically close to the first target rotational-speed. Second control means 10B includes a torque-capacity calculating means (or section) 10a and a distribution ratio setting means (or section) 10b. Torque-capacity calculating means 10a is configured to calculate or estimate a total transfer-torque capacity required to maintain the rotational speed of input shaft (the input-side rotational speed of disengagement-side clutch) substantially at the first target rotational-speed. The distribution ratio setting means 10b is configured to set a distribution ratio of transfer-torque capacity between the disengagement-side clutch and the engagement-side clutch, so as to make and keep the sum of a transfer-torque capacity of disengagement-side clutch and a transfer-torque capacity of engagement-side clutch substantially equal to the total transfer-torque capacity, and so as to gradually decrease the distribution to the disengagement-side clutch and gradually increase the distribution to the engagement-side clutch. Then, second control means 10B sets each of the transfer-torque capacity of disengagement-side clutch and the transfer-torque capacity of engagement-side clutch, in accordance with the calculated total transfer-torque capacity and the set distribution ratio. Then, second control means 10B adjusts each of the engagement control quantities (engagement-control parameters) for the disengagement-side clutch and engagement-side clutch, on the basis of the set transfer-torque capacities of disengagement-side clutch and engagement-side clutch.

Torque-capacity calculating means 10a calculates the total transfer-torque capacity, for example on the basis of parameter(s) according to an engine load obtained from a throttle opening, an accelerator opening, or the other information. Namely, during the changeover phase (the second control) by second control means 10B, the rotational speed of input shaft can be kept substantially constant while the total transfer-torque capacity which is transmitted by clutches is corresponding to the engine load. In other words, an engine speed (i.e., the rotational speed of input shaft) rises if the total transfer-torque capacity is smaller than a value corresponding to the engine load. Contrary, the engine speed falls if the total transfer-torque capacity is greater than a value corresponding to the engine load.

Third control means 10C is configured to adjust the engagement control quantity (parameter) for engagement-side clutch so as to cause the input-shaft rotational speed of transmission (the input-side rotational speed of engagement-side clutch) to gradually approach the second target rotational-speed. Fourth control means 10D is configured to increase the transfer-torque capacity of engagement-side clutch to its maximum capacity. A transition from the preparation phase to the changeover phase is done, under the condition where an actual rotational speed nr of input shaft has reached the (first) target rotational-speed n1 and a configuration change of the gear train associated with the engagement-side clutch has been completed. Namely, the transition from the preparation phase to the changeover phase is conducted, when actual input-shaft speed nr has reached target rotational-speed n1 and also the configuration change of engagement-side gear train has finished in the case where some other mechanical actuations besides the engagement/disengagement of clutch are needed to change the configuration of the engagement-side gear train. A transition from the changeover phase to the inertia phase is done, under the condition where the transfer-torque capacity of the disengagement-side clutch becomes substantially equal to 0 by means of the control of the changeover phase. Namely, the transition from the changeover phase to the inertia phase is conducted when the second control means has made the transfer-torque capacity of disengagement-side clutch equal to 0 during the changeover phase. A transition from the inertia phase to the finishing phase is done, under the condition where actual input-shaft speed nr has reached the (second) target rotational-speed n2. Namely, the transition from the inertia phase to the finishing phase is conducted when actual input-shaft speed nr becomes equal to the target rotational-speed n2. In this example, respective controls of the preparation phase and the inertia phase are terminated when actual input-shaft speed nr reaches the corresponding target speed values n1 and n2. Hence, these values n1 and n2 can be regarded as phase finishing threshold values. Especially since the finishing phase of shift control is started by using target speed value n2, target speed n2 can be regarded as a substantial (shift) control finishing threshold value.

It is favorable that these target speed values n1 and n2 which also mean such threshold values are set on the basis of the input speed (rotational speed of input member connected to the clutch, or rotational speed of input member of the clutch itself) and the engine load or some quantity corresponding to the engine load (such as throttle opening or engine torque), at the start time of the shift control or at the start time of phase. In the case where the engine load is greater than or equal to a predetermined level; target rotational-speed value (phase finishing threshold value) n1 of the preparation phase is set at a speed value which is greater than the pre-shift input speed, namely than the input speed (e.g. input-shaft rotation speed) (≈output speed) measured at the start time of the preparation phase, by a predetermined speed value $\Delta n1$. It is noted that the case where the engine load is greater than or equal to the predetermined level can be considered as the condition where the torque is being aggressively inputted from the engine, for example at the time of an automatic upshift. In this case, predetermined speed value $\Delta n1$ may be set at a constant value, or may be set so as to allow predetermined speed value $\Delta n1$ to vary in accordance with the engine load condition (such as throttle opening) and/or the input speed of start time of the preparation phase. More specifically, predetermined speed value $\Delta n1$ may be set so as to make predetermined speed value $\Delta n1$ greater as the engine load becomes greater, or so as to make predetermined speed value $\Delta n1$ greater as the input speed becomes higher.

In the case where the engine load is smaller than the predetermined level; target rotational-speed value (phase finishing threshold value) n1 of the preparation phase is set at a speed value which is lower than the pre-shift input speed, namely than the input speed (e.g. input-shaft rotation speed) measured at the start time of the preparation phase, by a predetermined speed value $\Delta n1'$. It is noted that the case where the engine load is smaller than the predetermined level can be considered as the coasting condition where the torque is not being aggressively inputted from the engine, for example at the time of the coasting upshift or coasting downshift. Also in this case, predetermined speed value $\Delta n1'$ may be set at a constant value, or may be set so as to allow predetermined speed value $\Delta n1'$ to vary in accordance with the input speed of start time of the preparation phase. More specifically, predetermined speed value $\Delta n1'$ may be set so as to make predetermined speed value $\Delta n1'$ greater as the input speed becomes higher.

In the case of upshift; target rotational-speed value (control finishing threshold value) n2 of the inertia phase is set at a speed value which is greater than the post-shift input speed, namely than the input speed (e.g. input-shaft rotation speed) scheduled after the finish of inertia phase, by a predetermined speed value $\Delta n2$. In this case, predetermined speed value $\Delta n2$ may be set at a constant value, or may be set so as to allow predetermined speed value $\Delta n2$ to vary in accordance with the engine load condition (such as throttle opening) and/or the input speed of start time of the preparation phase. More specifically, predetermined speed value $\Delta n2$ may be set so as to make predetermined speed value $\Delta n2$ greater as the engine load becomes greater, or so as to make predetermined speed value $\Delta n2$ greater as the input speed becomes higher.

In the case of downshift; target rotational-speed value (control finishing threshold value) n2 of the inertia phase is set at a speed value which is lower than the post-shift input speed, namely than the input speed (e.g. input-shaft rotation speed) scheduled after the finish of inertia phase, by a predetermined speed value $\Delta n2'$. Also in this case, predetermined speed value $\Delta n2'$ may be set at a constant value, or may be set so as to allow predetermined speed value $\Delta n2'$ to vary in accordance with the engine load condition (such as throttle opening) and/or the input speed of start time of the preparation phase. More specifically, predetermined speed value $\Delta n2'$ may be set so as to make predetermined speed value $\Delta n2'$ greater as the engine load becomes greater, or so as to make predetermined speed value $\Delta n2'$ greater as the input speed becomes higher.

In addition, since the output rotational speed before the (execution of) shift is approximately equal to the output rotational speed after the shift, the post-shift input speed nas can be calculated from the pre-shift input speed nbs, pre-shift transmission ratio Rbs of input speed to output speed, and post-shift transmission ratio Ras of input speed to output speed, by using the following equation.

$$nas=(Ras/Rbs) \times nbs$$

<Time Chart in the Case of Automatic Upshift>

Figure 9:
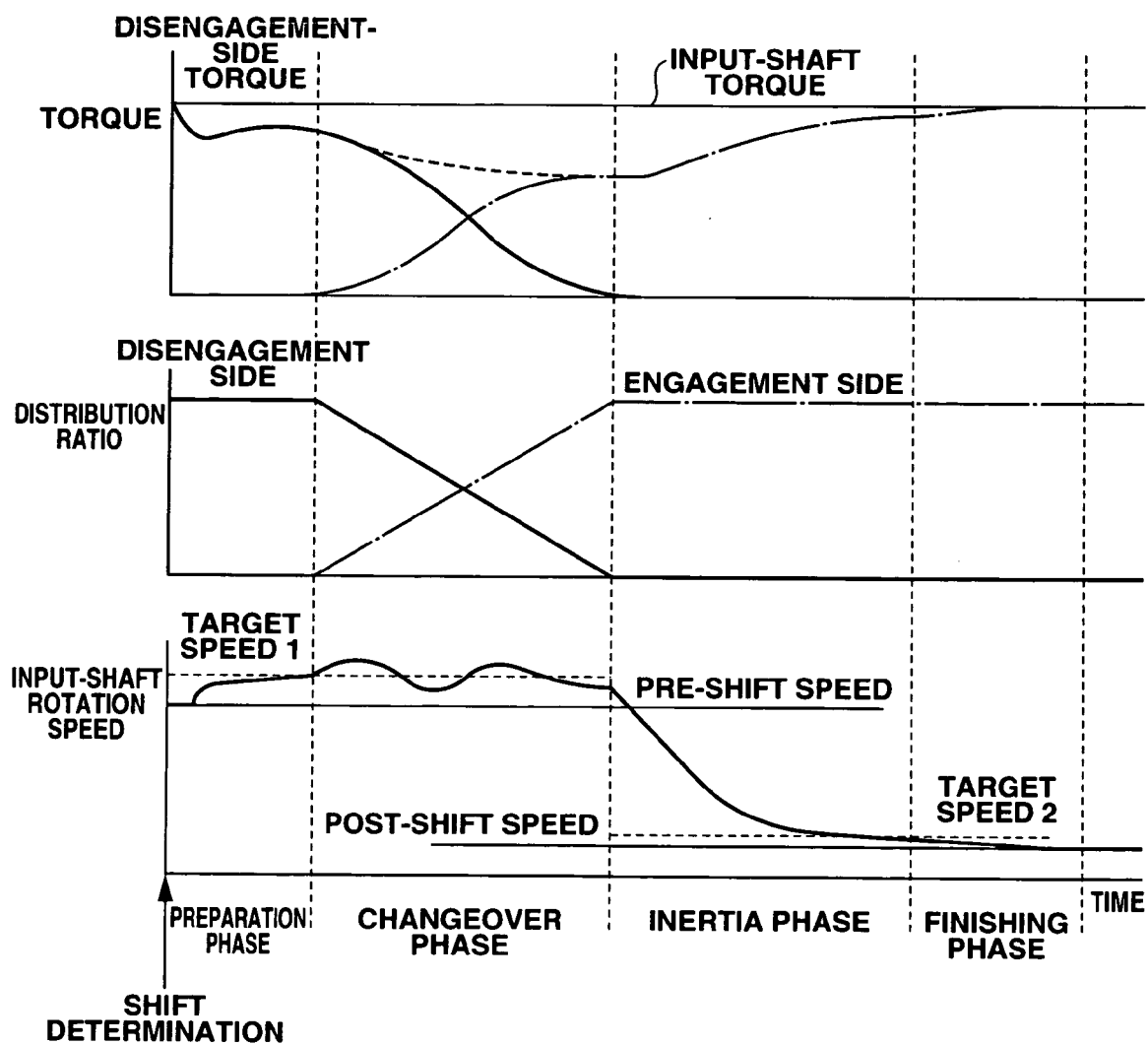
FIG. 9 is a time chart explaining an example of the changeover control according to the first embodiment.

The shift (changeover) control according to this embodiment will now be explained in the case of automatic upshift (i.e., upshift carried out because of increase of vehicle speed when depressing an accelerator pedal), with reference to a time chart of FIG. 9. As shown in FIG. 9, at first in the preparation phase, the target rotational speed of input shaft in the case of automatic upshift is set at first target speed value n1 which is greater than the input-shaft rotational speed (pre-shift speed ns) of the start time of preparation phase by predetermined speed (differential speed) value $\Delta n1$. Then, actual rotational speed nr of input shaft is gradually brought closer to this target rotational-speed n1. Some types of automatic transmission need some other mechanical actuations (such as a changing operation for gear-step by the synchro) on its power-transmitting line than the engagement/disengagement of clutch, in order to change configuration of the engagement-side gear train. In the case of such a transmission, the preparation phase continues until the configuration of engagement-side gear train has been set to a configuration for the shift-step scheduled to be performed, by the mechanical actuations.

When input-shaft actual speed nr has reached target rotational-speed n1, and the change of configuration of engagement-side gear train which is conducted by the mechanical actuations other than the engagement/disengagement of clutch has been completed; subsequent changeover phase is started. During this changeover phase, the distribution ratio between disengagement-side clutch 1 and engagement-side clutch 2 is controlled while maintaining input-shaft actual speed nr at target speed value n1. Namely in the changeover phase, the closed disengagement-side clutch 1 is disengaged and the open engagement-side clutch 2 is engaged, while controlling the distribution ratio between disengagement-side clutch 1 and engagement-side clutch 2.

Namely in order to disengage disengagement-side clutch 1 while engaging engagement-side clutch 2; the torque distribution (rate or ratio) of disengagement-side clutch 1 is gradually decreased and at the same time the torque distribution (ratio) of engagement-side clutch 2 is gradually increased, from the condition where the torque distribution Rt1 of disengagement-side clutch 1 is equal to 100% and torque distribution Rt2 of engagement-side clutch 2 is equal to 0%. Then finally, disengagement-side clutch 1 and engagement-side clutch 2 are brought to the condition where torque distribution Rt1 of disengagement-side clutch 1 is equal to 0% and torque distribution Rt2 of engagement-side clutch 2 is equal to 100%.

In detail, distribution ratio setting means 10b is configured to update torque distribution Rt1 for disengagement-side clutch 1 and torque distribution Rt2 for engagement-side clutch 2 every control period (routine) in the manner as shown by the following relations, from the time point when the changeover phase starts.

$$Rt1(n)=Rt1(n-1)-\Delta Rt$$

$$Rt2(n)=Rt2(n-1)+\Delta Rt$$

In the above relations, it is noted that a variable n takes 1 (n=1) at the time point of start of the changeover phase, and variable n is incremented by 1 every control period. Moreover, the definitions of $\Delta Rt<<1$, $Rt1(0)=1$, and $Rt2(0)=0$ are added to the above two relations.

In order to maintain input-shaft actual speed nr at target speed value n1, a load torque Tc against the input shaft (namely, the total amount of two of the transfer-torque of disengagement-side clutch 1 and the transfer-torque of engagement-side clutch 2) needs to be controlled. This total amount of two of the transfer-torque of disengagement-side clutch 1 and the transfer-torque of engagement-side clutch 2 is also called simply a total torque amount or total transfer-torque capacity, in the following explanations of this embodiment.

Hence, torque-capacity calculating means 10a calculates total torque amount Tc which is capable of maintaining input-shaft actual speed nr at target speed value n1, every control period. A clutch-torque calculating means included in second control means 10B calculates, every control period, a torque distribution amount T1 (n) for disengagement-side clutch 1 and a torque distribution amount T2 (n) for engagement-side clutch 2 on the basis of total torque amount Tc (n), torque distribution Rt1 (n), and torque distribution Rt2 (n), by using the following two relations.

$$T1(n)=Tc(n)\times Rt1(n)$$

$$T2(n)=Tc(n)\times Rt2(n)$$

Furthermore, the capacity/pressure conversion section converts torque distribution amount T1 (n) of disengagement-side clutch 1 and torque distribution amount T2 (n) of engagement-side clutch, respectively to control-command pressure values P1 (n) and P2 (n) for adjusting hydraulic pressures for clutches 1 and 2.

By so doing, when torque distribution Rt1 of disengagement-side clutch 1 has varied and become equal to 0% and torque distribution Rt2 for engagement-side clutch 2 has become equal to 100% (from 0%); the changeover phase is terminated and subsequent inertia phase is started. In the inertia phase of this automatic-upshift case, the target rotational speed of input shaft is set at second target speed value n2 which is greater than the calculable post-shift input speed (or output speed) of engagement-side clutch 2 by predetermined speed (differential speed) value $\Delta n2$. Then, the actual rotational speed of input shaft is gradually brought closer to second target speed value n2. When the actual rotational speed of input shaft has reached second target speed value n2, the inertia phase is terminated and subsequent finishing phase is started. In the finishing phase, the actual torque of engagement-side clutch 2 is gradually increased. Then, engagement-side clutch 2 is completely engaged, and the shift (changeover) control is finished.

<Block Diagram>

Figure 10:
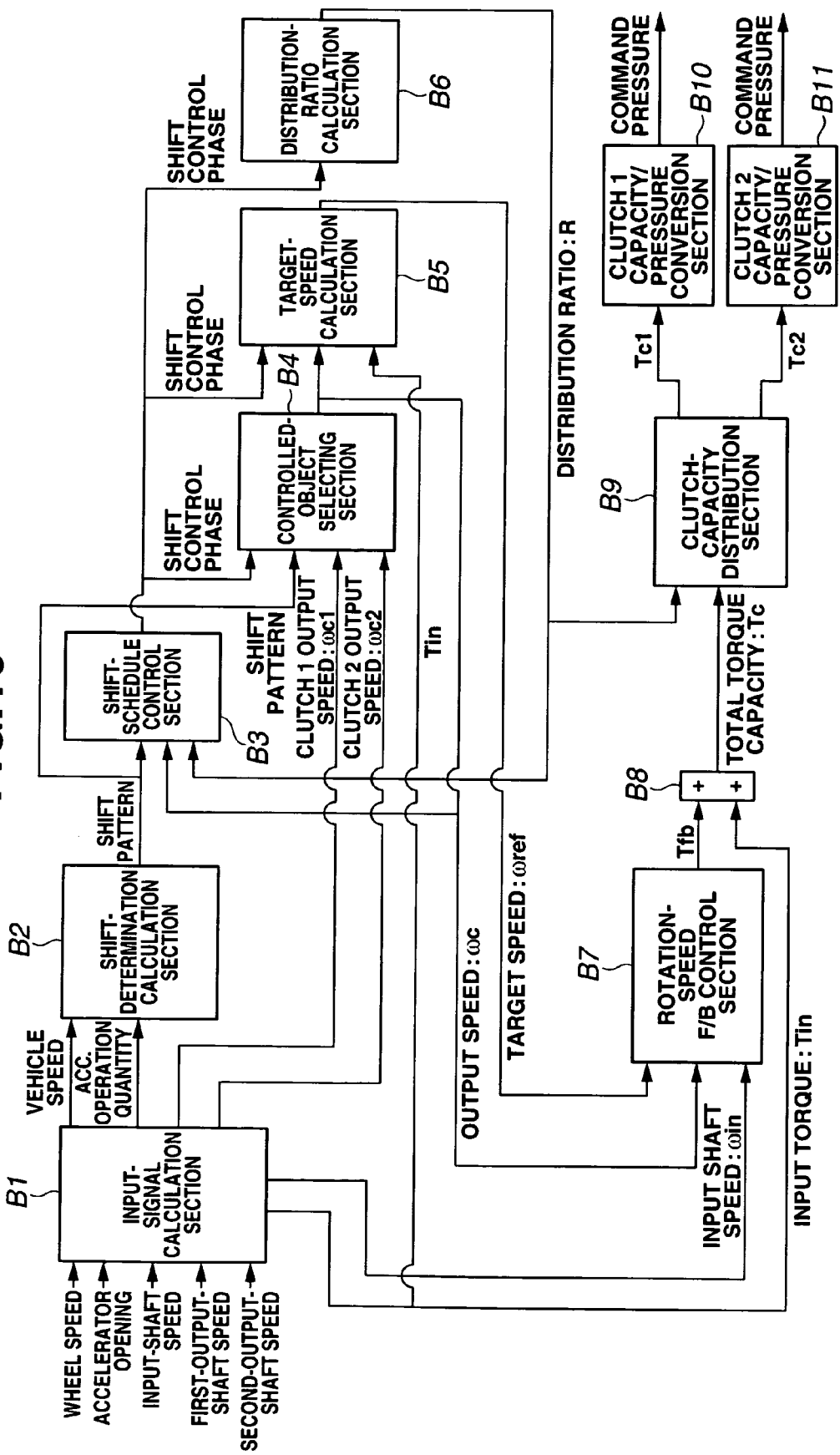
FIG. 10 is a schematic block diagram showing a detailed control configuration of the shift (changeover) control apparatus according to the first embodiment.

Next, a concrete control-configuration of the apparatus according to this embodiment will now be explained by using a block diagram of FIG. 10. Of course, this apparatus includes functional components explained with reference to FIG. 1, as control functions. As shown in FIG. 10, this apparatus includes an input-signal calculation section B1, a shift determination calculation section B2, a shift-schedule control section B3, a controlled-object selecting section B4, a target-speed calculation section B5, a distribution-ratio calculation section B6, rotation-speed feedback control section B7, an adding section B8, clutch-capacity distribution section B9, clutch-1 capacity/pressure conversion section B10, and clutch-2 capacity/pressure conversion section B11.

Although target-speed calculation section B5 corresponds to target-value setting means 10E as shown in FIG. 7; first control means 10A, second control means 10B, third control means 10C, and fourth control means 10D shown in FIG. 7 can be respectively configured by properly combining one or more of above-mentioned sections B1 to B11.

Input-signal calculation section B1 is configured to carry out a processing for input signals. These input signals include a wheel-speed signal serving to produce the signal of vehicle speed, an accelerator opening signal serving to produce the signal of accelerator operation quantity (i.e., accelerator manipulated variable), an input-shaft signal representing the input-side rotational speed of clutch 1 or clutch 2, a first output-shaft signal representing the output-side rotational speed of clutch 1, a second output-shaft signal representing the output-side rotational speed of clutch 2, and the like.

Shift determination calculation section B2 receives the vehicle-speed signal and the signal of accelerator operation quantity from input-signal calculation section B1, and produces a shift pattern by using a prescribed shift map relative to these signals (i.e., by assigning signals of vehicle-speed and accelerator operation quantity to a prescribed shift map). This shift pattern may represent no shift (non-shift state). Shift-schedule control section B3 monitors or checks the shift pattern, the input-shaft rotational speed, the output-side rotational speed ωc of the clutch targeted for control, and the torque-capacity distribution ratio R for both clutches. By this monitoring, shift-schedule control section B3 judges a progress of the shift control, and thereby selects one phase from the preparation phase, the changeover phase, the inertia phase, and the finishing phase. Namely, shift-schedule control section B3 produces a phase for shift control.

Controlled-object selecting section B4 is configured to select the clutch targeted for control (i.e., clutch scheduled to be controlled), in conformity with each shift control, on the basis of the shift pattern produced by shift determination calculation section B2 and the shift-control phase produced by shift-schedule control section B3. Then, controlled-object selecting section B4 calculates output-side rotational speed ωc of the control-targeted clutch, from output rotational-speed signal of the selected clutch. Target-speed calculation section B5 calculates or produces the target rotational speed, in conformity with each shift control, on the basis of the output-side speed ωc of control-targeted clutch and the shift-control phase produced by shift-schedule control section B3. At this time, target-speed calculation section B5 sets target input-shaft speed (value) ωref so as to make target input-shaft speed ωref greater than output-side rotational speed ωc of the control-targeted clutch in the case where the sign of input-shaft torque Tin is plus (i.e., positive) in the preparation phase. On the other hand in the case where the sign of input-shaft torque Tin is minus, i.e., negative, target-speed calculation section B5 sets target input-shaft speed ωref so as to make target input-shaft speed ωref lower than output-side rotational speed ωc of the control-targeted clutch.

Distribution-ratio calculation section B6 calculates or produces torque-capacity distribution ratio R between clutches, in conformity with each shift control, on the basis of the shift-control phase produced by shift-schedule control section B3. Rotation-speed feedback control section B7 produces a feedback control quantity (i.e., parameter for F/B or correction amount of F/B) Tfb for target speed, by using output-side speed (value) ωc of the control-targeted clutch, target rotational speed ωref, input-side rotational speed ωin.

Adding section B8 calculates or produces total torque capacity Tc of clutch, by adding feedback correction amount Tfb produced by rotation-speed F/B control section B7 to input-shaft torque Tin (corresponding to an open-control quantity). Clutch-capacity distribution section B9 distributes or divides this total torque capacity Tc into respective clutches, in accordance with torque-capacity distribution ratio R produced by distribution-ratio calculation section B6. Thus-distributed torque capacities are defined as clutch-1 capacity Tc1 and clutch-2 capacity Tc2.

Finally, clutch-1 capacity/pressure conversion section B10 converts clutch-1 capacity Tc1 into a control-command pressure for clutch 1, and clutch-2 capacity/pressure conversion section B11 converts clutch-2 capacity Tc2 into a control-command pressure for clutch 2. By using these command pressures, respective clutches are adjusted.

<Flowchart>

Figure 11:
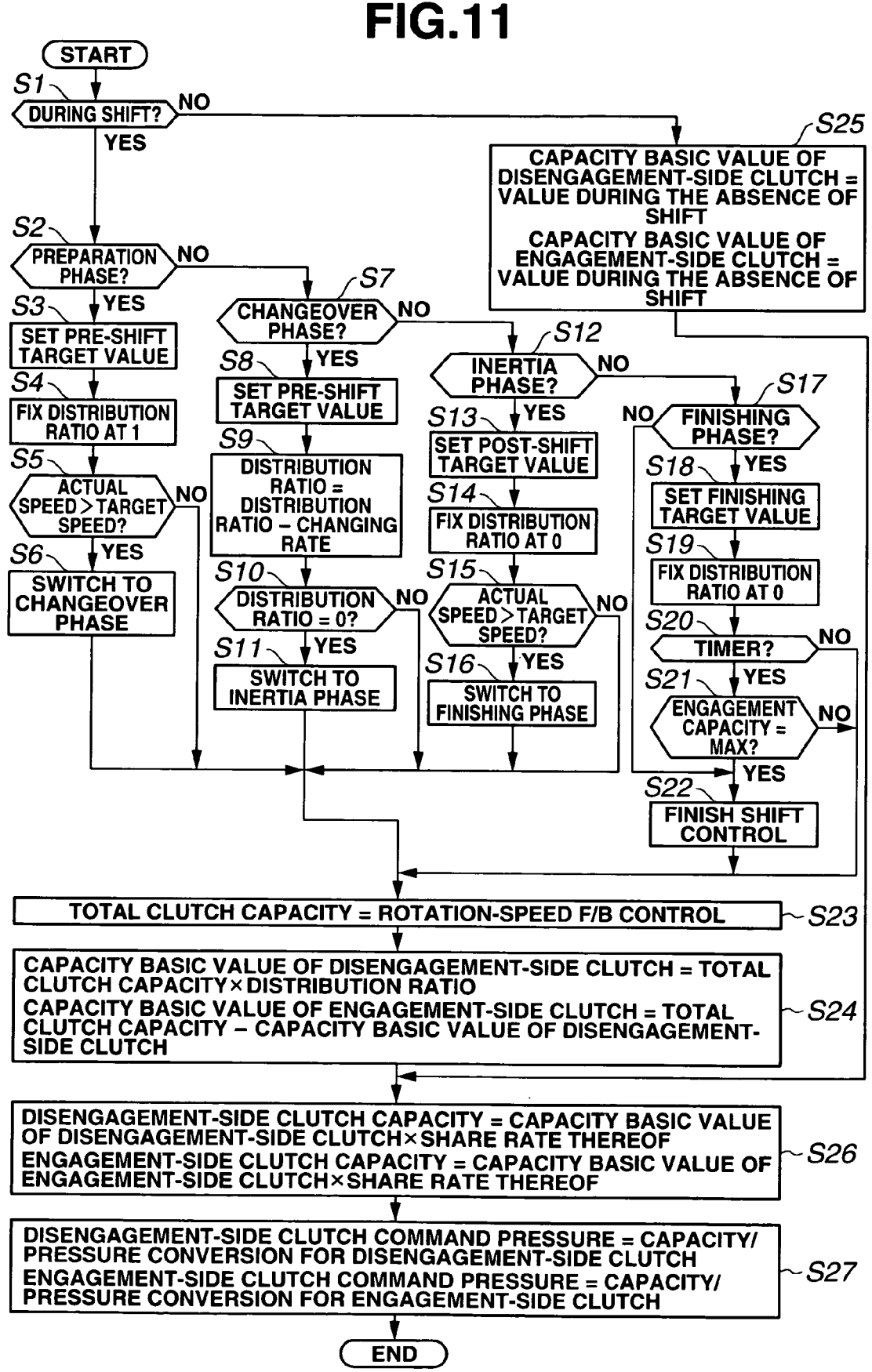
FIG. 11 is a flowchart explaining the changeover control according to the first embodiment.

Since the shift control apparatus according to this embodiment is constructed as described above, for example the shift (changeover) control is performed as shown in the flowchart of FIG. 11. At step S1, the controller judges whether or not the vehicle is currently under shift control. If the answer of step S1 is YES, namely the shift control is currently being executed; the routine proceeds to step S2. At step S2, the controller judges whether or not the shift control is currently in process of the preparation phase. At first, at the start time of the shift, the preparation phase is selected. During this preparation phase, the controller sets the target value for the differential-speed control relative to input speed, to target rotational speed n1 serving as the pre-shift control-target value (pre-shift target speed), at step S3. This pre-shift control-target value is set at a value higher than the rotational speed of start time of shift control, in the case of shift up. In the case of shift down, the pre-shift control-target value is set at a value lower than the rotational speed of start time of shift control. At the same time, the controller fixes the distribution (ratio) of disengagement-side clutch at equal to 1, at step S4. On the other hand, the controller fixes the distribution (ratio) of engagement-side clutch at equal to 0.

Then at step S5, the controller judges whether or not the actual rotational speed of disengagement-side clutch has reached the pre-shift target speed. Since the mechanical changing actuation for gear-step by the synchro is necessary on its power-transmitting line in this embodiment; the controller also judges whether or not the engagement-side gear train has become a configuration for the shift-step scheduled to be attained, by means of such a mechanical actuation, at step S5. Namely, this judgmental requirement is added to the requirement that the actual rotational speed has already reached the pre-shift target speed, as "AND" logical requirement. As mentioned above, some types of automatic transmission need some other mechanical actuations (such as a changing operation for gear-step by the synchro) on its power-transmitting line than the engagement/disengagement of clutch, in order to change configuration of the engagement-side gear train. In the case of such a transmission, the requirement that the engagement-side gear train has become a configuration for the shift-step scheduled to be performed is added to the requirement of step S5 by AND logic.

If the actual rotational speed of disengagement-side clutch has not yet reached the pre-shift target speed, or if the engagement-side gear train has not yet provided the configuration for shift-step scheduled to be attained, by means of mechanical actuation; the controller executes each processing of the clutch-capacity calculation and the clutch command-hydraulic-pressure calculation in steps S23, S24, S26, and S27.

Namely at step S23, the controller sets the total clutch-torque capacity, by comparing the actual rotational speed with the target rotational speed and by feeding back the comparative result (i.e. by way of feedback control). In other words, the controller reduces the total clutch-torque capacity by a predetermined (very-)small amount, if the actual rotational speed of the input side of clutch is lower than the target rotational speed; and the controller increases the total clutch-torque capacity by a predetermined very-small amount, if the actual rotational speed of the input side of clutch is higher than the target rotational speed. At a subsequent step S24, the controller calculates a disengagement-side capacity basic value, by multiplying the total clutch-torque capacity by the distribution ratio thereof. On the other hand, the controller calculates an engagement-side capacity basic value, by subtracting the disengagement-side capacity basic value from the total clutch-torque capacity. Moreover at step S26, the controller calculates a final disengagement-side capacity and a final engagement-side capacity, by correcting the respective disengagement-side capacity basic value and engagement-side capacity basic value in consideration of a clutch share ratio which is dependent on the transmission structure and its shift-step. It is noted that this step S26 is unnecessary in the case of a transmission adapted to cause both of the share (ratio) of the disengagement-side clutch and the share (ratio) of the engagement-side clutch to always become equal to 1. Finally at step S27, the controller converts the (final) torque capacity of disengagement-side clutch and the (final) torque capacity of engagement-side clutch into a command hydraulic pressure for disengagement-side clutch and a command hydraulic pressure for engagement-side clutch, on the basis of a capacity/hydraulic-pressure characteristic of each clutch. Then, the controller outputs a command based on these command hydraulic pressures to an actuator(s).

Thus, the preparation phase continues by repeating the processing of steps S1, S2, S3, S4, S5, S23, S24, S26, and S27 every control period (routine-program period). Thereby, the actual rotational speed is brought closer to the target rotational speed. Also in the case of a transmission having the feature that the configuration change of engagement-side gear train needs to be conducted by the mechanical actuation other than the engagement/disengagement of clutch, the engagement-side gear train becomes a configuration for the shift-step scheduled to be performed, by means of such a mechanical actuation.

By so doing, the controller determines that the actual speed of disengagement-side clutch has reached the pre-shift target speed at step S5. In the case of a transmission having the feature that the configuration change of engagement-side gear train needs to be conducted by the mechanical actuation other than the engagement/disengagement of clutch, the controller also determines that the engagement-side gear train has become a configuration for the shift-step scheduled to be performed, by means of the mechanical actuation. In this case, the controller finishes the preparation phase, the routine proceeds to step S6. At step S6, the controller sets the transition to the changeover phase. Thereby, during next control period; the controller determines that the preparation phase is not currently in process at step S2, and determines that the changeover phase is in process at step S7 by judging whether or not the shift control is currently in process of the changeover phase. Then at step S8, the controller sets the target value for differential-speed control to the pre-shift control-target value. At the same time, the controller gradually decreases the distribution (ratio) for disengagement-side clutch, and gradually increases the distribution (ratio) for engagement-side clutch at a predetermined changing rate, at step S9. Then, the controller judges whether or not the distribution (ratio) of disengagement-side clutch is equal to 0 at step S10.

The processing of above-mentioned steps S23, S24, S26, and S27 is carried out on the basis of the set distribution ratio also in this changeover phase, since the distribution (ratio) of disengagement-side clutch does not reach equal to 0 for a while from the start time of changeover phase. Namely, the controller respectively calculates the total clutch-torque capacity at step S23, the disengagement-side capacity basic value and the engagement-side capacity basic value at step S24, and the final disengagement-side capacity and the final engagement-side capacity at step S26. Then at step S27, the controller converts to the command pressure for disengagement-side clutch and the command pressure for engagement-side clutch, and instructs the actuator for these two clutches.

By repeating such a processing of the changeover phase, the distribution (ratio) of disengagement-side clutch gradually decreases at step S9. Accordingly, it comes to be determined that the distribution (ratio) of disengagement-side clutch is equal to 0, at step S10. In this case, the controller finishes the changeover phase at step S11. At step S11, the controller sets the transition to the inertia phase. Thereby, during next control period; the controller determines that the changeover phase is not in process at step S7 subsequent to step S2. Then, the controller determines that the inertia phase is in process at step S12 by judging whether or not the shift control is currently in process of the inertia phase.

When it is determined that the inertia phase is in process at step S12, the controller sets the target value for differential-speed control to target speed n2 defining the post-shift target value at step S13. At the same time, the controller fixes the distribution (ratio) of disengagement-side clutch at equal to 0, at step S14. On the other hand, the controller fixes the distribution (ratio) of engagement-side clutch at equal to 1. Then at step S15, the controller judges whether or not the current actual speed has reached the target speed, by comparing the actual speed with the target speed.

If the actual speed has not yet reached the target speed; also in this inertia phase, the controller respectively calculates the total clutch-torque capacity at step S23, the disengagement-side capacity basic value and the engagement-side capacity basic value at step S24, and the final disengagement-side capacity and the final engagement-side capacity at step S26. Then at step S27, the controller converts to the command pressure for disengagement-side clutch and the command pressure for engagement-side clutch, and instructs the actuator.

By repeating the control period (i.e., program routine) during the inertia phase, the actual rotational speed comes to reach the target rotational speed. Accordingly, the controller determines that the actual rotational speed has reached the target rotational speed, at step S15. In this case, the controller finishes the inertia phase, and sets the transition to the finishing phase, at step S16. Thereby, during the next control period; the controller determines that the changeover phase is not in process at step S7 subsequent to step S2, and then determines that the inertia phase is not in process at step S12. Then, the controller determines that the finishing phase is in process by judging whether or not the shift control is currently in process of the finishing phase at step S17.

In this case, the controller sets the target rotational speed (target value for the differential-speed control) to a finishing-control target value, at step S18. At the same time, the controller fixes the distribution (ratio) for disengagement-side clutch at equal to 0, and fixes the distribution (ratio) for engagement-side clutch at equal to 1, at step S19. Then at step s20, the controller judges whether or not a predetermined time (duration) has elapsed by using a timer. If it is determined that the predetermined time has elapsed at step S20; the controller judges whether or not the engagement-capacity of engagement-side clutch has reached a predetermined value, at step S21.

When the predetermined time has not yet elapsed, or when the engagement-capacity of engagement-side clutch has not yet reached the predetermined value even if the predetermined time has already elapsed; the controller respectively calculates the total clutch-torque capacity on the basis of the finishing-control target value at step S23, the disengagement-side capacity basic value and the engagement-side capacity basic value at step S24, and the final disengagement-side capacity and the final engagement-side capacity at step S26. Then at step S27, the controller converts to the command pressure for disengagement-side clutch and the command pressure for engagement-side clutch, and outputs these commands to the actuator.

If it is determined that the predetermined time has elapsed and the engagement-capacity of engagement-side clutch has reached the predetermined value, at steps S20 and S21; the controller finishes the shift control and prepares a transition to a non-shift-time control at step S22. Thereby during next control period, the controller determines that the shift is not currently being executed at step S1, and the routine proceeds to step S25. At step S25, the controller sets a torque-capacity basic value of disengagement-side clutch for non-shift time (i.e., a value necessary during no execution of the shift motion) and a torque-capacity basic value of engagement-side clutch for non-shift time. Then at step S26, the controller calculates the final disengagement-side capacity and the final engagement-side capacity, by correcting the respective disengagement-side capacity basic value and engagement-side capacity basic value in consideration of the clutch share ratio which is dependent on the transmission structure such as clutch structure and its shift-step. Then, the controller converts to the command hydraulic pressure for disengagement-side clutch and the command hydraulic pressure for engagement-side clutch, at step S27; and instructs the actuator(s). The shift control of this example according to the first embodiment is performed by repeating the above-described processing at the predetermined control period (routine-program period).

<Time Chart at the Time of Coasting Upshift>

Figure 12:
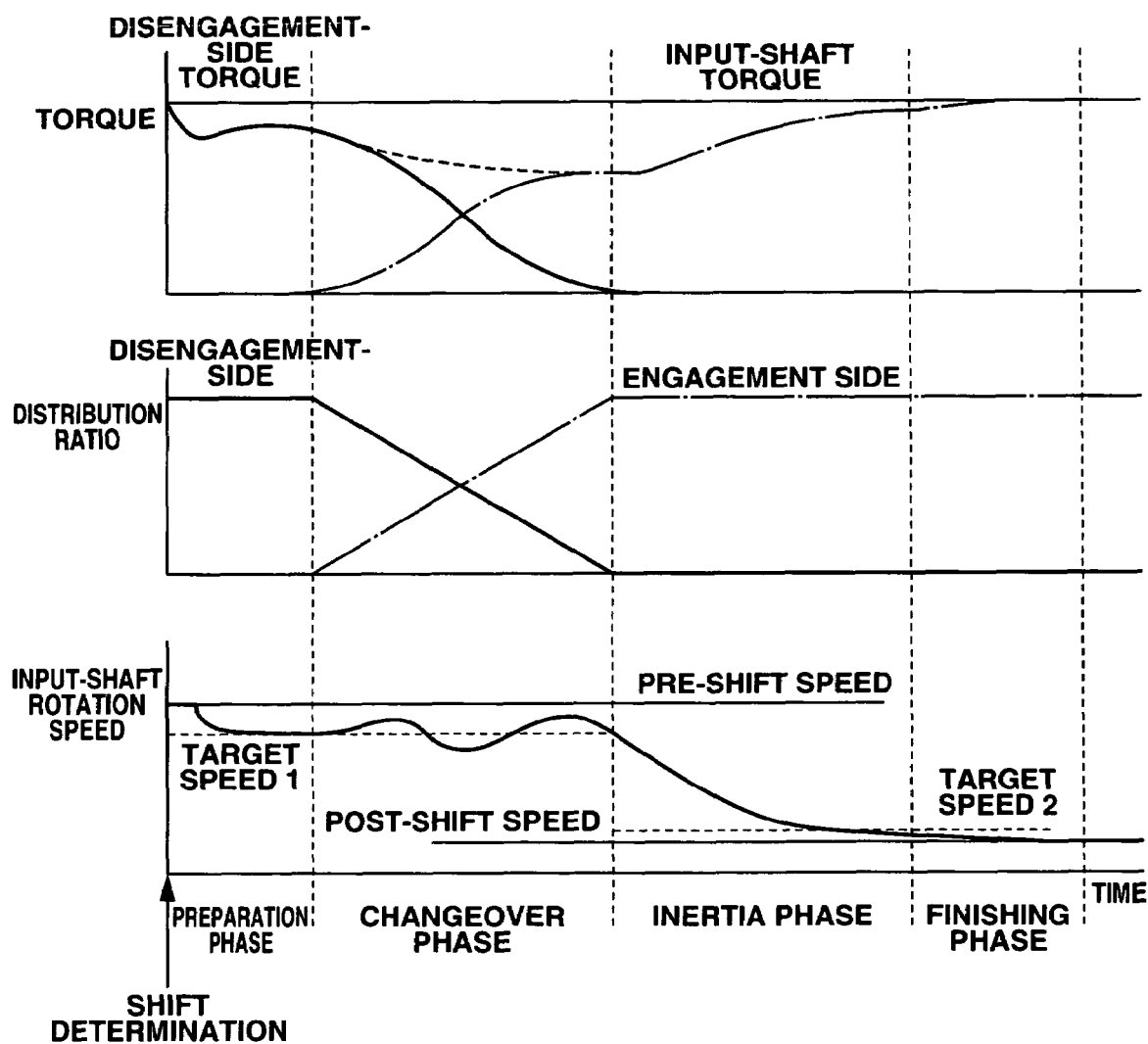
FIG. 12 is a time chart explaining the other example of the changeover control according to the first embodiment.

FIG. 12 shows an example that applies the shift (changeover) control according to the first embodiment to the coasting upshift (i.e., upshift necessary to be executed when decreasing a depression amount of accelerator pedal or when decreasing a load requirement by depression release). In FIG. 12, the input-shaft torque is shown as an absolute (constant) value for the sake of comparison with the clutch torque-capacity. However actually, the input-shaft torque has negative sign, or takes low values near zero.

In the example of automatic upshift as shown in FIG. 9, the shift is performed in order to increase a driving torque which is transmitted from the clutch input-side to clutch output-side (i.e., increase the transfer-torque capacity of clutch). Hence, the rotational speed of input side becomes higher than the rotational speed of output side, when causing the clutch to slip. Therefore, first target speed value n1 for input shaft during the preparation phase and changeover phase is set at a value higher than its rotational speed produced at the start time of shift control (i.e., at the start time of preparation phase) by a specified quantity.

On the other hand in the example of coasting upshift, the shift is performed in order to reduce the input rotational speed rather than to increase the driving torque. Hence, the rotational speed of input side becomes lower than the rotational speed of output side, when causing the clutch to slip. Therefore as shown in FIG. 12, first target speed value n1 for input shaft during the preparation phase and changeover phase is set at a value lower than its rotational speed produced at the start time of shift control by a specified quantity. Accordingly, the determination of the finish of preparation phase (determination of the start of changeover phase) needs to be made when the rotational speed of input shaft falls below this first target speed value n1 (i.e., reaches this first target speed value n1).

<Time Chart at the Time of Coasting Downshift>

Figure 13:
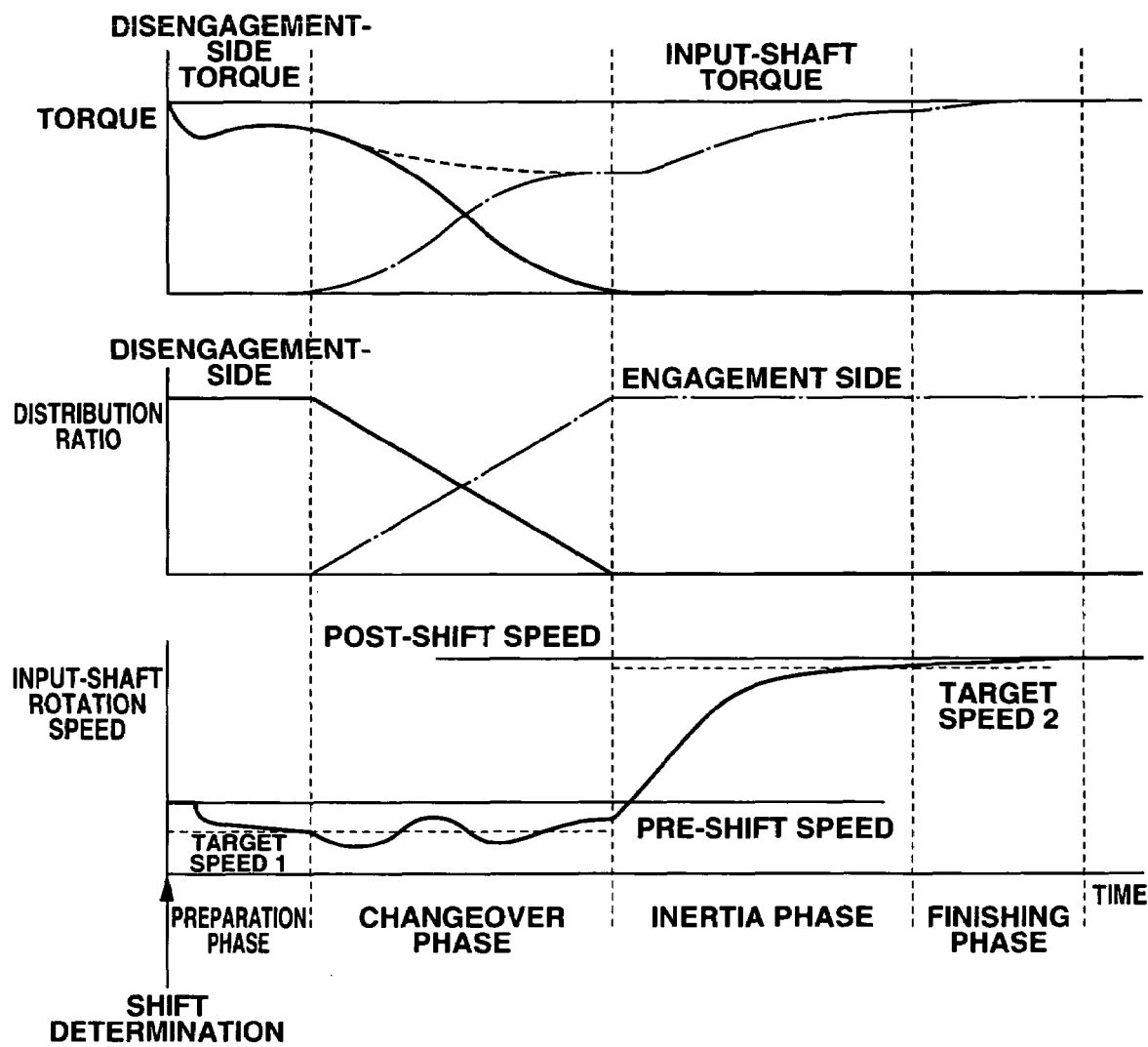
FIG. 13 is a time chart explaining still the other example of the changeover control according to the first embodiment.

FIG. 13 shows an example that applies the shift (changeover) control according to the first embodiment to the coasting downshift (i.e., downshift necessary to be executed when decreasing the load requirement by the depression release of accelerator pedal, or downshift for generating an engine brake). In FIG. 13, the input-shaft torque is shown as an absolute (constant) value for the sake of comparison with the clutch torque-capacity, in the similar manner as FIG. 12. However actually, the input-shaft torque has negative sign, or takes low values near zero.

In this case, the rotational speed of input shaft varies only in lower-speed direction from its rotational speed indicated at start time of the shift, when reducing the driving torque to be transmitted (transfer torque capacity of the clutch). Hence, first target speed n1 for the preparation phase and changeover phase needs to be set at a value lower than its rotational speed indicated at the start time of shift. Therefore, the determination of the finish of preparation phase and the determination of the start of changeover phase need to be made when the rotational speed of input shaft falls below this first target speed value n1 (i.e., reaches this first target speed value n1).

Since the post-shift speed is naturally expected to become higher than the pre-shift speed because of the downshift, second target speed n2 is set for a value lower than the post-shift speed. Accordingly, the rotational speed of input shaft smoothly rises up to the post-shift speed after reaching the second target speed n2. Among these controls for above-exemplified shifts; only the setting of target value(s) is different, namely a configuration of control logic itself is unchanged. In other words, the setting of target value(s) is changed between two of above-exemplified shifts (automatic upshift, coasting upshift, coasting downshift, and . . . ).

Thus in the shift (changeover) control according to the first embodiment, the rotational speed of friction-engagement element(s) is controlled while focusing on the distribution condition of transfer torque. Namely, the shift control according to the first embodiment is separated into the control focused on torque and the control focused on rotational speed. In this embodiment, the conditions of these two controls are respectively satisfied, and finally a single control quantity (single controlled variable) such as the disengagement-side clutch command-pressure and the engagement-side clutch command-pressure can be outputted. Therefore, the smooth changeover motion can be achieved with a simple control logic.

Moreover, a disengaging timing of disengagement-side clutch and an engaging timing of engagement-side clutch can completely coincide (can be synchronized) with each other. Accordingly, the shift control according to the first embodiment has an advantage that the shift motion can be completed or finished promptly.

Second Embodiment

Figure 14:
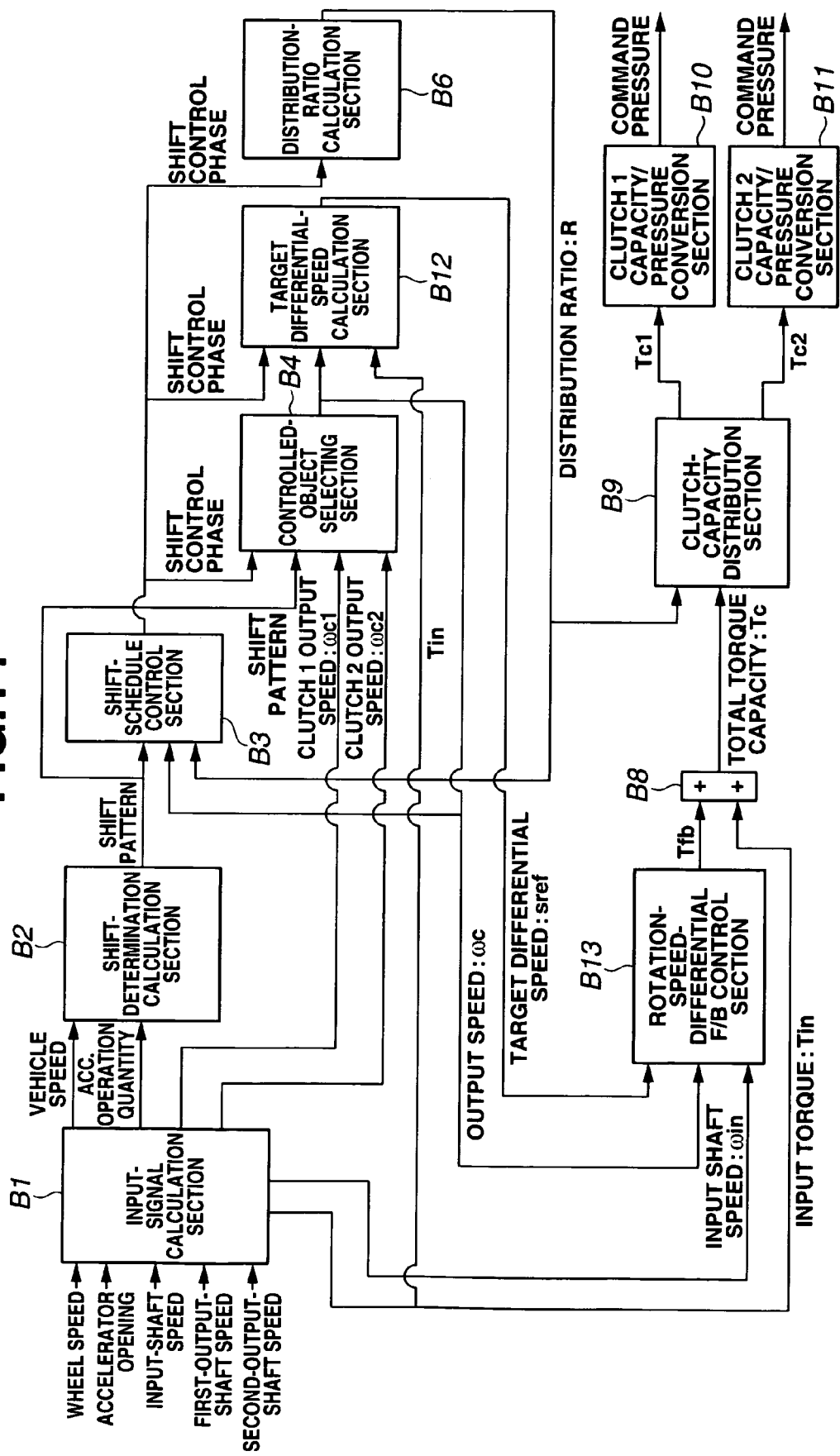
FIG. 14 is a schematic block diagram showing a control configuration of a shift (changeover) control apparatus for automatic transmission in a second embodiment according to the present invention, and corresponds to FIG. 10.
Figure 15:
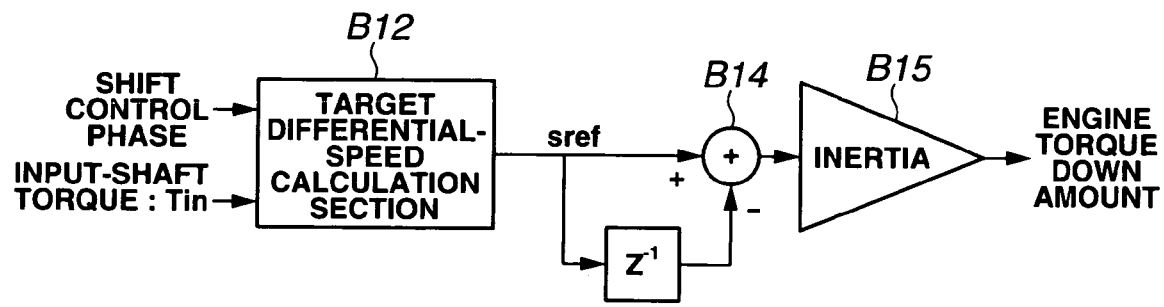
FIG. 15 is a control block diagram partially explaining the control configuration of the changeover control apparatus according to the second embodiment.
Figure 16:
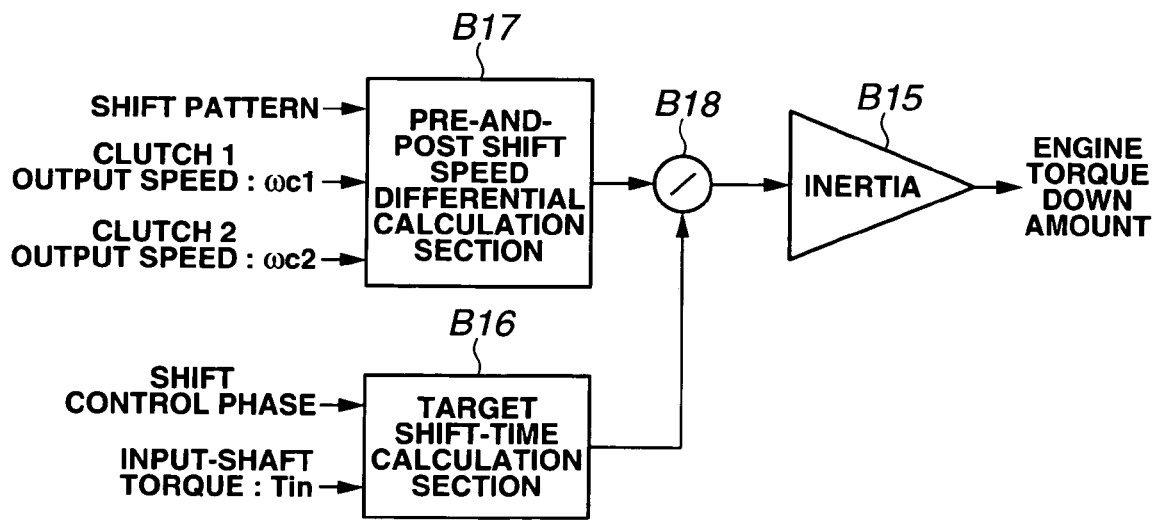
FIG. 16 is a control block diagram partially explaining the control configuration of the changeover control apparatus according to the second embodiment.

FIGS. 14-16 show shift control apparatus and method for an automatic transmission in a second embodiment according to the present invention. FIG. 14 is a schematic block diagram showing a concrete control configuration of the apparatus according to the second embodiment, namely FIG. 14 corresponds to FIG. 10 of first embodiment. In this second embodiment, the target value is defined by a target differential speed (target difference of rotational speed), although the target value has been defined by the target speed in the first embodiment. Since the configurations other than this configuration are similar as the first embodiment, only the blocks different from the first embodiment will now be explained.

In the first embodiment, first target speed value n1 for the input shaft is set at a value increased or reduced from the input-shaft rotational speed indicated at the start time of control by predetermined value $\Delta n$ ($\Delta n1$ or $\Delta n1'$). This means that a speed difference corresponding to predetermined value $\Delta n$ is given between the input side and the output side of disengagement-side clutch. Moreover in the first embodiment, the rotational speed of input shaft is controlled to become the first target speed value. This means that the shift control is performed so as to generate the speed difference corresponding to predetermined value $\Delta n$, between the input side and the output side of disengagement-side clutch after the start of shift control. Furthermore in the first embodiment, second target speed value n2 for the input shaft is set at a value increased or reduced from the post-shift rotational speed of input shaft by predetermined value $\Delta n'$ ($\Delta n2$ or $\Delta n2'$). This means that a speed difference corresponding to predetermined value $\Delta n'$ is given between the input side and the output side of engagement-side clutch. In the first embodiment, the rotational speed of input shaft is controlled to become the second target speed value. This means that the shift control is performed so as to generate the speed difference corresponding to predetermined value $\Delta n'$, between the input side and the output side of engagement-side clutch.

The clutch generates the rotation-speed difference (differential speed) between the input side of clutch and the output side of clutch, when the clutch is slipping. Under such a slipping state; the input side of clutch rotates at a speed corresponding to the speed of input shaft of transmission, and the output side of clutch rotates at a speed corresponding to the speed of a drive wheel. Therefore, the control for bringing the rotational speed of input shaft to the first target speed value in the first embodiment can mean that the speed difference is provided between the input side and the output side of disengagement-side clutch. Similarly, the control for bringing the rotational speed of input shaft to the second target speed value can mean that the speed difference is provided between the input side and the output side of engagement-side clutch. In other words, it can be considered that target-value setting means (section) 10E sets the first target rotational speed which is a target value for the input rotational speed of disengagement-side clutch on the basis of the output rotational speed of disengagement-side clutch and a first target differential speed of disengagement-side clutch, in the first embodiment. Similarly in the first embodiment, it can be considered that target-value setting means (section) 10E sets the second target rotational speed which is a target value for the input rotational speed of engagement-side clutch on the basis of the output rotational speed of engagement-side clutch and a second target differential speed of engagement-side clutch.

Therefore, the apparatus according to the second embodiment includes a target differential-speed calculation section B12 instead of target-speed calculation section B5 of the first embodiment, and a speed differential F/B control section (rotation-speed feedback control section) B13 instead of rotation-speed feedback control section B7 of the first embodiment. Target differential-speed calculation section B12 calculates or produces first target differential-speed sref1 corresponding to the first target speed produced by target-speed calculation section B5 in the first embodiment and second target differential-speed sref2 corresponding to the second target speed of the first embodiment, in conformity with each shift control, on the basis of the shift-control phase produced by shift-schedule control section B3. At this time, target differential-speed calculation section B12 sets each of target differential-speed values sref1 and sref2 for a positive value (i.e., plus) in the case where the sign of input-shaft torque Tin is plus (i.e., positive). On the other hand in the case where the sign of the input-shaft torque Tin is minus, i.e., negative, target differential-speed calculation section B12 sets each of target differential-speed values sref1 and sref2 for a negative value.

Speed differential F/B control section B13 produces a feedback control quantity (i.e., parameter for F/B or correction amount of F/B) Tfb for target differential speed, by using thus-set target differential speed (value) sref1 or sref2, output-side speed $\omega c$ of the control-targeted clutch, and input-side speed $\omega in$ of the control-targeted clutch.

In such a case where the shift control is performed with a focus on the target differential speed, a torque down amount during the inertia phase needs to be calculated from the target differential speed. For example, a block diagram of FIG. 15 or FIG. 16 shows a method of calculating this torque down amount.

In the method shown in FIG. 15 in the case where target differential rotation-speed sref (serf1 or sref2) is continuously varied; a difference calculation section B14 calculates the difference between target differential rotation-speed sref calculated from the shift-control phase and input torque Tin by target differential-speed calculation section B12, and its previous value (target differential rotation-speed sref in the last control period). Then, an integration section B15 regards this calculated difference as a changing rate (variation speed) of target differential speed, and then calculates the torque down amount of engine by multiplying this calculated difference (changing rate of target differential speed) by a value equivalent of an inertia of members related to this changing rate. On the other hand in the method shown in FIG. 16, the torque down amount during the inertia phase is calculated by estimating a rotation-speed change between before and after the shift and by calculating a target shift(-execution) time. Namely, a pre-and-post shift speed-differential calculation section B17 calculates the pre-and-post shift speed-differential (difference between the pre-shift rotational speed and the post-shift rotational speed), from the shift pattern, an output-shaft rotational speed $\omega c1$ of clutch 1, and an output-shaft rotational speed $\omega c2$ of clutch 2. Next, a target shift-time calculation section B16 calculates the target shift time (for example, time period necessary to achieve second target differential-speed sref2 from first target differential-speed sref1), from the shift-control phase and the input-shaft torque Tin. Then, a calculation section B18 calculates the quotient of pre-and-post shift speed-differential to the target shift time. Namely, the pre-and-post shift speed-differential is divided by the target shift time. Then, integration section B15 regards this calculated quotient as the changing rate of target differential speed, and then calculates the torque down amount of engine by multiplying this calculated quotient by the value equivalent of inertia. Then, a torque-down command based on this torque-down amount is outputted to the engine. Thus, the apparatus according to the second embodiment can perform the similar control as the first embodiment, by turning attention to the target differential speed. Thereby, the same advantages and effects as the first embodiment can be obtained.

Although the invention has been described above with reference to certain embodiments of the invention, the invention is not limited to the embodiments described above. Modifications and variations of the embodiments described above will occur to those skilled in the art in light of the above teachings.

For example in the above first and second embodiments, friction-engagement element control means 10 controls clutches 1 and 2 by using the rotational speed of input shaft as a control parameter. However, the rotational speed of the other input member related to this rotational speed of input shaft may be used as the control parameter, instead of the input-shaft rotational speed itself. Moreover, the control for clutches 1 and 2 may be performed by using the transmission ratio as the control parameter. Namely, since giving the rotation difference between the input and the output of clutch can mean slightly varying the apparent transmission ratio, the target transmission ratio (value) may be slightly varied from a pre-shift value or a post-shift value of transmission ratio. Thereby, the control for clutches 1 and 2 can be performed also so as to bring the transmission ratio closer to thus-set target transmission ratio.

If the transmission ratio is used as the control parameter, also the target value of clutch speed (corresponding to the control finishing threshold value) at the time of shift is determined by the transmission ratio (i.e., target transmission ratio) instead of the input rotational speed. Namely in the case where the target rotational speed is set at a speed value which is higher than the pre-shift input speed or post-shift input speed by predetermined speed value $\Delta n1$ or $\Delta n2$ in the above first and second embodiments, a target transmission ratio (phase finishing threshold value) r1 during the preparation phase or a target transmission ratio r2 during the inertia phase is set at a transmission ratio which is higher than the pre-shift transmission ratio or post-shift transmission ratio by a predetermined value $\Delta r1$ or $\Delta r2$. In the case where the target rotational speed is set at a speed value which is lower than the pre-shift input speed or post-shift input speed by predetermined speed value $\Delta n1'$ or $\Delta n2'$ in the above first and second embodiments, target transmission ratio r1 during the preparation phase or target transmission ratio r2 during the inertia phase is set at a transmission ratio which is lower than the pre-shift transmission ratio or post-shift transmission ratio by a predetermined value $\Delta r1'$ or $\Delta r2'$.

Moreover for example, in the case where the rotation difference of clutch 2 or input rotational speed (e.g., input-shaft rotational speed) corresponding to this rotation difference is controlled toward the target value, a trail (path) for this target value may be prescribed to vary the target value (from its pre-shift value to post-shift value) in accordance with the elapsed time, instead of setting the target value at a constant value. Namely, the shift control may be performed with a trail follow-up control that causes the control parameter to follow (trace) this target-value trail. Thereby, it becomes possible to achieve the shift control with a desired shift time or shift speed.

Furthermore in the above first and second embodiments, the automatic transmission shown in FIG. 8 has been used to explain the shift control apparatus and method according to the present invention. However, the shift control apparatus and method according to the present invention are widely applicable to the shifts (or changeover of friction-engagement element) for various automatic transmissions, as explained in principle referring to FIGS. 1 to 6.

[Advantages and Configurations According to Embodiments of the Present Invention]

In the shift control apparatus and method according to above embodiments of the present invention; when starting to switch or change the shift-step, at first, the controller carries out the first control that adjusts the engagement-control parameter for the first friction-engagement element to bring the rotational speed difference between the input and the output of the first friction-engagement element gradually close to the first target differential speed which is a target value antecedent to the change of shift-step, by causing the first friction-engagement element to slip. Then after this first control, the controller calculates or estimates the total transfer-torque capacity which is required to maintain the rotational speed difference of the first friction-engagement element substantially at the first target differential speed. Next, the controller sets the distribution ratio between transfer-torque capacity of the first friction-engagement element and transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element. Thereby, the controller carries out the second control that sets the transfer-torque capacities of the first and second friction-engagement elements on the basis of these total transfer-torque capacity and distribution ratio and that adjusts each of the engagement-control parameters for the first and second friction-engagement elements in accordance with the set transfer-torque capacities of the first and second friction-engagement elements. Therefore in such a configuration, the rotational speed of friction-engagement element is controlled with a focus on the distribution condition of transfer-torque, namely, the shift (changeover) control can be performed by dividing into the control based on torque and the control based on rotational speed and finally outputting the command as a single control parameter. In other words, the shift (changeover) control is not completely divided into the control based on torque and the control based on rotational speed. Thereby, a smooth shift (changeover) motion can be achieved with a simple control logic. Moreover, the disengaging timing of disengagement-side friction-engagement element and the engaging timing of engagement-side friction-engagement element can completely coincide (or can be synchronized) with each other. This shift control technique is easily applicable to various automatic transmissions, and can achieve a stable shift control more smoothly and with a little shock.

In the shift control apparatus and method according to above embodiments of the present invention; the target-value setting section (means) sets the second target differential speed which is a target value posterior to the change of shift-step for the rotational speed difference between input and output of the second friction-engagement element. Then, the third control section (means) carries out the third control that adjusts the engagement-control parameter for the second friction-engagement element to bring the rotational speed difference of the second friction-engagement element gradually close to the second target differential speed, when the second control has set the transfer-torque capacity of first friction-engagement element at equal to 0. Then, the friction-engagement element control section (means) substantially finishes the shift control by finishing the third control when the rotational speed difference of second friction-engagement element has become in range of the second target differential speed. Therefore in such a configuration, a smooth shift (changeover) motion can be achieved with a simple control logic, since a rotation variation of input can be caused by means of the change of target value. Moreover, the changeover motion can be completed smoothly while the friction-engagement element of engagement-side is smoothly closed (engaged).

In the shift control apparatus and method according to above embodiments of the present invention; the rotational-speed difference sensing section senses or calculates the rotational speed difference between the input and output of first friction-engagement element and the rotational speed difference between the input and output of second friction-engagement element. Then, the friction-engagement element control section (means) judges whether or not the transition from first control to second control is conducted and judges whether or not the third control should be finished, in accordance with the rotational speed difference sensed or calculated by the rotational-speed difference sensing section. Therefore in such a configuration, the changeover motion of the disengagement-side and engagement-side friction-engagement elements can be executed smoothly. Specifically in the case of a shift (change of shift-step) caused after a great variation of input torque, for example in the case of an upshift necessary when lifting a driver's foot off the accelerator pedal; the changeover motion can be started under a stable condition.

In the shift control apparatus and method according to above embodiments of the present invention; the target-value setting section (means) sets the first target rotational speed which is a target value for the input rotational speed of first friction-engagement element on the basis of the output rotational speed of first friction-engagement element and the first target differential speed. Then, the first control section (means) controls the rotational speed difference between the input and output of first friction-engagement element so as to bring the input rotational speed of first friction-engagement element gradually closer to the first target rotational speed. Then, the torque-capacity calculating section (means) of the second control section (means) calculates or estimates the total transfer-torque capacity of first and second friction-engagement elements which is required to maintain the input rotational speed of first friction-engagement element substantially at the first target rotational speed. Therefore in such a configuration, since the shift control is performed by focusing on the rotational speed instead of the differential rotational speed, the rotational speed can be assuredly regulated or adjusted.

In the shift control apparatus and method according to above embodiments of the present invention; the first target rotational speed is set at a value higher than the output rotational speed of the first friction-engagement element in the case where the input rotational speed of first friction-engagement element increases when reducing the transfer-torque capacity of the first friction-engagement element. On the other hand, the first target rotational speed is set at a value lower than the output rotational speed of first friction-engagement element in the case where the input rotational speed of first friction-engagement element decreases when reducing the transfer-torque capacity of first friction-engagement element. Therefore in such a configuration, any of the coasting shift and the power-on shift can be performed by only simply changing how to give the target value, without changing the control logic (control contents).

In the shift control apparatus and method according to above embodiments of the present invention; the target-value setting section (means) determines whether the input rotational speed of first friction-engagement element increases or decreases when reducing the transfer-torque capacity of first friction-engagement element, in accordance with the magnitude or the sign of engine load of the engine connected with the automatic transmission. Therefore in such a configuration, the target rotational speed difference or the target rotational speed can be predetermined based on the operating condition of engine.

In the shift control apparatus and method according to above embodiments of the present invention; the target-value setting section (means) sets each of the first and second target rotational speed values, in accordance with the engine load, and the input rotational speed of corresponding friction-engagement element or the transmission ratio. Therefore in such a configuration, an appropriate target value dependent upon the magnitude of input torque and the magnitude of rotational speed can be provided.

In the shift control apparatus and method according to above embodiments of the present invention; the friction-engagement element control section (means) may regard one of the input rotational speed of second friction-engagement element and the rotational speed of input member of the automatic transmission, as a control parameter, when carrying out the third control that controls the rotational speed difference of second friction-engagement element. Then, the target-value setting section (means) may set the target value of control parameter at its post-shift rotational speed (i.e., a value scheduled to finally become after the shift). Then, the third control section (means) may bring a measured value of the control parameter gradually close to the target value of control parameter, when controlling the rotational speed difference of second friction-engagement element. Therefore in such a configuration, the shift control with a simple target value can be achieved.

In the shift control apparatus and method according to above embodiments of the present invention; the control parameter may be the input rotational speed of second friction-engagement element or the rotational speed of input member. Then, the control-finish threshold value is set at a value greater than the post-shift rotational speed of control parameter in the case of upshift, and is set at a value lower than the post-shift rotational speed in the case of downshift. Therefore in such a configuration, the same control logic can be applied to both of the upshift and the downshift.

In the shift control apparatus and method according to above embodiments of the present invention; the control-finish threshold value may be set on the basis of one of the engine load, the throttle opening, and the engine torque, and one of the rotational speed of input member, the input rotational speed of second friction-engagement element, and the transmission ratio. Therefore in such a configuration, an appropriate target value dependent upon the magnitude of input torque and the magnitude of rotational speed can be provided.

In the shift control apparatus and method according to above embodiments of the present invention; the engine command section calculates the torque-down amount from the product of the variation rate of control-parameter's target value and the inertia of members related to the variation rate, and outputs the torque-down command based on the torque-down amount to the engine, while carrying out the third control. Therefore in such a configuration, a torque amount error related to inertia can be properly eliminated.

In the shift control apparatus and method according to above embodiments of the present invention; the friction-engagement element control section (means) may set the engagement-control parameter for each of the first and second friction-engagement elements in accordance with the transfer-torque capacity of corresponding friction-engagement element, by using the frictional resistance characteristic against the rotational speed difference between the input and output of corresponding friction-engagement element. Therefore in such a configuration, the command pressure for each friction-engagement element can be set in conformity with the characteristic between the transfer-torque capacity and the hydraulic pressure of corresponding friction-engagement element.

In the shift control apparatus and method according to above embodiments of the present invention; the friction-engagement element control section (means) may set the engagement-control parameter for each of the first and second friction-engagement elements in accordance with the transfer-torque capacity of corresponding friction-engagement element, by using the initial hydraulic pressure for starting the engagement of corresponding friction-engagement element. Therefore in such a configuration, each engagement-control parameter can be set more accurately, since an amount corresponding to the initial hydraulic pressure of friction-engagement element at the time of engaging start is corrected.

In the shift control apparatus and method according to above embodiments of the present invention; the friction-engagement element control section (means) may continue to carry out the fourth control after completing the change of shift-step (or shift control). Therefore in such a configuration, the control during non-shift time can be performed by using the similar control-logic (shift logic) as the control during the execution of shift.

This application is based on a prior Japanese Patent Application No. 2005-207536 filed on Jul. 15, 2005. The entire contents of this Japanese Patent Application are hereby incorporated by reference.

The scope of the invention is defined with reference to the following claims.

What is claimed is:

1. A shift control apparatus comprising:
an automatic transmission adapted to vary and output a rotational speed inputted from an engine by engaging any of a plurality of friction-engagement elements in accordance with a shift-step of the transmission, the plurality of friction-engagement elements including
a first friction-engagement element adapted to be changed from an engaged state to a disengaged state when changing the shift-step, and
a second friction-engagement element adapted to be changed from the disengaged state to the engaged state when changing the shift-step; and
a friction-engagement element control section configured to control the first and second friction-engagement elements by adjusting each of an engagement-control parameter for the first friction-engagement element and an engagement-control parameter for the second friction-engagement element when changing the shift-step, the friction-engagement element control section including;
  a target-value setting section configured to set a first target differential speed which is a target value antecedent to the change of shift-step for a rotational speed difference between an input and an output of the first friction-engagement element;
  a first control section configured to carry out a first control that adjusts the engagement-control parameter for the first friction-engagement element to bring the rotational speed difference between the input and the output of the first friction-engagement element gradually close to the first target differential speed, by causing the first friction-engagement element to slip from a start time of the change of shift-step; and
  a second control section having
    a torque-capacity calculating section configured to calculate or estimate a total transfer-torque capacity which is required to maintain the rotational speed difference of the first friction-engagement element substantially at the first target differential speed, and
    a distribution ratio setting section configured to set a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element;
  the second control section being configured to carry out a second control after the first control, the second control
    setting the transfer-torque capacities of the first and second friction-engagement elements on the basis of the total transfer-torque capacity calculated or estimated by the torque-capacity calculating section and the distribution ratio set by the distribution ratio setting section, and
    adjusting each of the engagement-control parameters for the first and second friction-engagement elements, in accordance with the set transfer-torque capacities of the first and second friction-engagement elements.

2. The shift control apparatus as claimed in claim 1, wherein
  the target-value setting section is configured to set a second target differential speed which is a target value posterior to the change of shift-step for a rotational speed difference between an input and an output of the second friction-engagement element;
  the friction-engagement element control section further includes
    a third control section configured to carry out a third control that adjusts the engagement-control parameter for the second friction-engagement element to bring the rotational speed difference between the input and the output of the second friction-engagement element gradually close to the second target differential speed, when the second control has set the transfer-torque capacity of the first friction-engagement element at equal to 0; and
  the friction-engagement element control section is configured to substantially finish the shift control by finishing the third control when the rotational speed difference of the second friction-engagement element has become in range of the second target differential speed.

3. The shift control apparatus as claimed in claim 2, wherein
  the shift control apparatus further comprises a rotational-speed difference sensing section adapted to sense or calculate the rotational speed difference between the input and the output of the first friction-engagement element and the rotational speed difference between the input and the output of the second friction-engagement element; and
  the friction-engagement element control section is configured to judge whether or not a transition from the first control to the second control is conducted and judge whether or not the third control is finished, in accordance with the rotational speed difference sensed or calculated by the rotational-speed difference sensing section.

4. The shift control apparatus as claimed in claim 1, wherein
  the target-value setting section is configured to set a first target rotational speed which is a target value for an input rotational speed of the first friction-engagement element on the basis of an output rotational speed of the first friction-engagement element and the first target differential speed;
  the first control section is configured to control the rotational speed difference between the input and the output of the first friction-engagement element so as to bring the input rotational speed of the first friction-engagement element gradually close to the first target rotational speed; and
  the torque-capacity calculating section of the second control section is configured to calculate or estimate the total transfer-torque capacity of the first and second friction-engagement elements which is required to maintain the input rotational speed of the first friction-engagement element substantially at the first target rotational speed.

5. The shift control apparatus as claimed in claim 4, wherein
  the target-value setting section is configured to set a second target rotational speed which is a target value for an input rotational speed of the second friction-engagement element on the basis of an output rotational speed of the second friction-engagement element and the second target differential speed; and
  the third control section is configured to control the rotational speed difference between the input and the output of the second friction-engagement element so as to bring the input rotational speed of the second friction-engagement element gradually close to the second target rotational speed.

6. The shift control apparatus as claimed in claim 4, wherein
  the first target rotational speed is set at a value higher than the output rotational speed of the first friction-engagement element in the case where the input rotational speed of the first friction-engagement element increases when reducing the transfer-torque capacity of the first friction-engagement element, and is set at a value lower than the output rotational speed of the first friction-engagement element in the case where the input rotational speed of the first friction-engagement element decreases when reducing the transfer-torque capacity of the first friction-engagement element.

7. The shift control apparatus as claimed in claim 6, wherein
the target-value setting section determines whether the input rotational speed of the first friction-engagement element increases or decreases when reducing the transfer-torque capacity of the first friction-engagement element, in accordance with a magnitude or a sign of engine load of the engine connected with the automatic transmission.

8. The shift control apparatus as claimed in claim 5, wherein
the target-value setting section is configured to set each of the first and second target rotational speed values, in accordance with an engine load of the engine connected with the automatic transmission, and the input rotational speed of the corresponding friction-engagement element or a transmission ratio.

9. The shift control apparatus as claimed in claim 2, wherein
the friction-engagement element control section is configured to regard one of an input rotational speed of the second friction-engagement element, a transmission ratio, and a rotational speed of an input member of the automatic transmission, as a control parameter, when carrying out the third control that controls the rotational speed difference of the second friction-engagement element;
the target-value setting section is configured to produce a trail for a target value of the control parameter so as to vary the control-parameter target value from a pre-shift value to a post-shift value; and
the third control section is configured to control the second friction-engagement element by way of a trail follow-up control that causes a measured value of the control parameter to follow the produced target-value trail for the control parameter, when controlling the rotational speed difference of the second friction-engagement element.

10. The shift control apparatus as claimed in claim 2, wherein
the friction-engagement element control section is configured to regard one of an input rotational speed of the second friction-engagement element and a rotational speed of an input member of the automatic transmission, as a control parameter, when carrying out the third control that controls the rotational speed difference of the second friction-engagement element;
the target-value setting section is configured to set a target value of the control parameter at its post-shift rotational speed; and
the third control section is configured to bring a measured value of the control parameter gradually close to the target value of the control parameter, when controlling the rotational speed difference of the second friction-engagement element.

11. The shift control apparatus as claimed in claim 9, wherein
the friction-engagement element control section is configured to substantially finish the shift control when the measured value of the control parameter has reached a predetermined control-finish threshold value as the result of execution of the trail follow-up control.

12. The shift control apparatus as claimed in claim 11, wherein the control parameter is one of the input rotational speed of the second friction-engagement element and the rotational speed of the input member; and
the control-finish threshold value is set at a value greater than the post-shift rotational speed in the case of an upshift, and is set at a value lower than the post-shift rotational speed in the case of a downshift.

13. The shift control apparatus as claimed in claim 11, wherein
the control-finish threshold value is set on the basis of an engine load and one of the rotational speed of the input member, the input rotational speed of the second friction-engagement element, and a transmission ratio.

14. The shift control apparatus as claimed in claim 9, wherein
the shift control apparatus further comprises an engine command section configured to calculate a torque-down amount from the product of a variation rate of the control-parameter target value and an inertia of members related to the variation rate, and configured to output a torque-down command based on the torque-down amount to the engine, while carrying out the third control.

15. The shift control apparatus as claimed in claim 14, wherein
the variation rate of the target value is calculated from a difference between a current target value and a previous target value of the control parameter.

16. The shift control apparatus as claimed in claim 14, wherein
the torque-down amount is calculated on the basis of a time period necessary to achieve the second target differential speed from the first target differential speed.

17. The shift control apparatus as claimed in claim 1, wherein
each of the first and second friction-engagement elements is a hydraulically-controlled multiple disc clutch, and the engagement-control parameter for each of the first and second friction-engagement elements is a control pressure for the hydraulically-controlled multiple disc clutch.

18. The shift control apparatus as claimed in claim 1, wherein
the friction-engagement element control section is configured to calculate corrected transfer-torque capacities of the first and second friction-engagement elements by correcting the set transfer-torque capacities of the first and second friction-engagement elements in consideration of a clutch share ratio which is dependent on a structure of the first and second friction-engagement elements, and configured to set the engagement-control parameter for each of the first and second friction-engagement elements in accordance with the corrected transfer-torque capacity of the corresponding friction-engagement element.

19. The shift control apparatus as claimed in claim 1, wherein
the friction-engagement element control section is configured to set the engagement-control parameter for each of the first and second friction-engagement elements in accordance with the transfer-torque capacity of the corresponding friction-engagement element, by using a frictional resistance characteristic against the rotational speed difference between the input and the output of the corresponding friction-engagement element.

20. The shift control apparatus as claimed in claim 1, wherein the friction-engagement element control section is configured to set the engagement-control parameter for each of the first and second friction-engagement elements in accordance with the transfer-torque capacity of the corresponding friction-engagement element, by using an initial hydraulic pressure for starting the engagement of the corresponding friction-engagement element.

21. The shift control apparatus as claimed in claim 1, wherein
the automatic transmission is adapted to perform a mechanical actuation in addition to the engagement and disengagement of the first and second friction-engagement elements when changing the shift-step; and
a transition from the first control to the second control is conducted under the condition where the mechanical actuation has been completed.

22. The shift control apparatus as claimed in claim 2, wherein
the friction-engagement element control section further includes
a fourth control section configured to carry out a fourth control that increases the transfer-torque capacity of the second friction-engagement element up to its maximum capacity when the rotational speed difference between the input and the output of the second friction-engagement element has reached the second target differential speed by means of the third control.

23. The shift control apparatus as claimed in claim 22, wherein
the friction-engagement element control section is configured to continue to carry out the fourth control after completing the change of shift-step.

24. The shift control apparatus as claimed in claim 1, wherein
both input sides of the first and second friction-engagement elements are adapted to rotate integrally with a common input member;
the first and second friction-engagement elements are disposed in parallel with each other; and
the first friction-engagement element is connected with a first shift-gear mechanism, and the second friction-engagement element is connected with a second shift-gear mechanism.

25. A shift control method for an automatic transmission adapted to transmit a power by engaging any of a plurality of friction-engagement elements in accordance with a shift-step of the transmission, the plurality of friction-engagement elements including
a first friction-engagement element adapted to be changed from an engaged state to a disengaged state when changing the shift-step, and
a second friction-engagement element adapted to be changed from the disengaged state to the engaged state when changing the shift-step, the shift control method comprising:
a first step of adjusting an engagement-control parameter for the first friction-engagement element to bring a rotational speed difference between an input and an output of the first friction-engagement element gradually close to a target differential speed set as a target value antecedent to the change of shift-step, by causing the first friction-engagement element to slip from a start time of the change of shift-step; and
a second step of
calculating or estimating a total transfer-torque capacity which is required to maintain the rotational speed difference of the first friction-engagement element substantially at the target differential speed,
setting a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element,
setting the transfer-torque capacities of the first and second friction-engagement elements on the basis of the calculated or estimated total transfer-torque capacity and the set distribution ratio, and
adjusting each of the engagement-control parameters for the first and second friction-engagement elements, in accordance with the set transfer-torque capacities of the first and second friction-engagement elements.

26. The shift control method as claimed in claim 25, wherein the shift control method further comprises
a third step of adjusting the engagement-control parameter for the second friction-engagement element to bring a rotational speed difference between an input and an output of the second friction-engagement element gradually close to a target differential speed set as a target value posterior to the change of shift-step, when the transfer-torque capacity of the first friction-engagement element has become equal to 0 by way of the second step.

27. The shift control method as claimed in claim 26, wherein the shift control method further comprises
a fourth step of increasing the transfer-torque capacity of the second friction-engagement element up to its maximum capacity when the rotational speed difference between the input and the output of the second friction-engagement element has reached the target differential speed of the third step by way of the third step.

28. A shift control apparatus comprising:
an automatic transmission adapted to vary and output a rotational speed inputted from an engine by engaging any of a plurality of friction-engagement elements in accordance with a shift-step of the transmission, the plurality of friction-engagement elements including
a first friction-engagement element adapted to be changed from an engaged state to a disengaged state when changing the shift-step, and
a second friction-engagement element adapted to be changed from the disengaged state to the engaged state when changing the shift-step; and
friction-engagement element control means for controlling the first and second friction-engagement elements by adjusting each of an engagement-control parameter for the first friction-engagement element and an engagement-control parameter for the second friction-engagement element when changing the shift-step, the friction-engagement element control means including;
target-value setting means for setting a first target differential speed which is a target value antecedent to the change of shift-step for a rotational speed difference between an input and an output of the first friction-engagement element;
first control means for carrying out a first control that adjusts the engagement-control parameter for the first friction-engagement element to bring the rotational speed difference between the input and the output of the first friction-engagement element gradually close to the first target differential speed, by causing the first friction-engagement element to slip from a start time of the change of shift-step; and second control means for carrying out a second control after the first control, the second control means having
- torque-capacity calculating means for calculating or estimating a total transfer-torque capacity which is required to maintain the rotational speed difference of the first friction-engagement element substantially at the first target differential speed, and
- distribution ratio setting means for setting a distribution ratio between a transfer-torque capacity of the first friction-engagement element and a transfer-torque capacity of the second friction-engagement element, so as to maintain the sum of the transfer-torque capacities of the first and second friction-engagement elements substantially equal to the total transfer-torque capacity and so as to gradually decrease a distribution to the first friction-engagement element and gradually increase a distribution to the second friction-engagement element;

the second control
- setting the transfer-torque capacities of the first and second friction-engagement elements on the basis of the total transfer-torque capacity calculated or estimated by the torque-capacity calculating means and the distribution ratio set by the distribution ratio setting means, and
- adjusting each of the engagement-control parameters for the first and second friction-engagement elements, in accordance with the set transfer-torque capacities of the first and second friction-engagement elements.

* * * * *